(12) United States Patent
Oseko

(10) Patent No.: US 8,263,881 B2
(45) Date of Patent: Sep. 11, 2012

(54) WEIGHING SCALE THAT AUTOMATICALLY SWITCHES BETWEEN A DISPLAY MODE OR A COMMUNICATIONS MODE BASED ON WHETHER COMMUNICATIONS IS ESTABLISHED WITH ANOTHER SCALE

(75) Inventor: Naoshi Oseko, Itabashi-ku (JP)

(73) Assignee: Tanita Corporation, Itabashi-Ku, Tokyo (JP)

( * ) Notice: Subject to any disclaimer, the term of this patent is extended or adjusted under 35 U.S.C. 154(b) by 337 days.

(21) Appl. No.: 12/752,612

(22) Filed: Apr. 1, 2010

(65) Prior Publication Data

US 2010/0252334 A1    Oct. 7, 2010

(30) Foreign Application Priority Data

Apr. 3, 2009   (JP) ................................. 2009-090902

(51) Int. Cl.
*G01G 19/00*   (2006.01)
(52) U.S. Cl. .......... 177/25.13; 340/666; 700/3; 700/305
(58) Field of Classification Search ............... 177/25.11, 177/25.13; 340/666; 700/3, 305; 705/407, 705/414–416
See application file for complete search history.

(56) References Cited

U.S. PATENT DOCUMENTS

| | | | | |
|---|---|---|---|---|
| 6,603,082 | B1 * | 8/2003 | Delbruck et al. | 177/132 |
| 6,639,156 | B2 * | 10/2003 | Luke et al. | 177/25.13 |
| 6,875,932 | B2 * | 4/2005 | Tuft | 177/25.13 |
| 7,211,748 | B2 * | 5/2007 | Lauke et a | 177/199 |
| 7,279,645 | B1 * | 10/2007 | Inglin et al. | 177/145 |
| 7,592,552 | B2 * | 9/2009 | Duppre | 177/25.13 |
| 2006/0041394 | A1 * | 2/2006 | Kuwayama et al. | 702/57 |
| 2007/0067141 | A1 * | 3/2007 | Beshears et al. | 702/173 |
| 2008/0053712 | A1 | 3/2008 | Duppre | |
| 2008/0264141 | A1 | 10/2008 | Kenmochi | |

FOREIGN PATENT DOCUMENTS

| | | |
|---|---|---|
| JP | 60-185125 A | 9/1985 |
| JP | 2000-298056 A | 10/2000 |
| JP | 2003-028707 A | 1/2003 |
| JP | 2008-268147 A | 11/2008 |

OTHER PUBLICATIONS

Official Action dated May 10, 2011, issued by the Japanese Patent Office in corresponding Japanese Patent Application No. 2009-090902, and English language translation of the Official Action.
Extended European Search Report issued by the European Patent Office on Jun. 15, 2010 in European Application No. 10156725, 5 pgs.

* cited by examiner

*Primary Examiner* — Randy W Gibson
(74) *Attorney, Agent, or Firm* — Buchanan Ingersoll & Rooney PC

(57) ABSTRACT

A weighing scale has a display unit for displaying the weight of an object loaded on a platform measured by a weight measurer, a communication unit for transmitting weight data to, or receiving from, another weighing scale, a determiner that determines whether the weighing scale is capable of communicating via the communication unit with another weighing scale, and a controller that, in a case in which a result of the determination by the determiner shows that the weighing scale is not capable of communicating with another weighing scale, controls the display unit to display weight data output by the weight measurer, and in a case in which a result of the determination by the determiner shows that the weighing scale is capable of communicating with another weighing scale, that transmits weight data to, or receives from, another weighing scale.

7 Claims, 15 Drawing Sheets

FIG. 9

TOTAL WEIGHT: 80 kg —14

WEIGHING SCALE THAT AUTOMATICALLY SWITCHES BETWEEN A DISPLAY MODE OR A COMMUNICATIONS MODE BASED ON WHETHER COMMUNICATIONS IS ESTABLISHED WITH ANOTHER SCALE

BACKGROUND OF THE INVENTION

1. Field of the Invention

The present invention relates to a weighing scale that can be connected to another weighing scale that has the same functions.

2. Description of Related Art

Conventionally, there is known a weighing scale having a weight measurer for measuring the weight of an object placed on a measurement surface (platform) to output weight data, and having a display unit for displaying weight data output from the weight measurer (for example, refer to Japanese Patent Application Laid-Open Publication No. 2008-268147, hereinafter referred to as JP 2008-268147).

However, in the technique described in JP 2008-268147, it is difficult to measure the weight of an object to be weighed, for example, (a) in a case in which the object is too large to be loaded onto the platform of one weighing scale, (b) in a case in which the object is so heavy that the weight thereof exceeds the effective weighing range, or (c) in a case in which there are plural objects to be weighed and in which a user wishes to simultaneously acquire individual information (a weight value, proportion of one object in the total weight of plural objects, etc.) on each object.

SUMMARY OF INVENTION

In consideration of the above, the present invention has, as objects, to provide a weighing scale capable of aggregating weight data of plural weighing scales including this weighing scale and at least one weighing scale having the same functions as those of this weighing scale, by connecting the weighing to the at least one weighing scale.

In order to solve the above-described problems, the present invention provides a weighing scale having: a platform for loading an object to be weighed; a weight measurer for measuring the weight of the object to be weighed when the object is loaded on the platform, to output weight data representing the measured weight; a display unit for displaying, as a measurement result, the weight represented by the weight data output by the weight measurer; a communication unit for transmitting the weight data to another weighing scale and for receiving weight data from the another weighing scale; a determiner that determines whether the weighing scale is capable of communicating with the another weighing scale via the communication unit; and a controller that controls the display unit to display the weight represented indicated by the weight data output by the weight measurer in a case in which a result of the determination by the determiner indicates that the weighing scale is not capable of communicating with the another weighing scale, and that transmits the weight data to, or receives from, the another weighing scale, in a case in which a result of the determination by the determiner indicates that the weighing scale is capable of communicating with the another weighing scale.

According to this weighing scale, in a case in which an object to be weighed is too large to be loaded on the platform of one weighing scale or in a case in which the object is so heavy that the weight thereof cannot be measured by one weighing scale alone, the weight of such an object to be weighed can be easily measured by having plural weighing scales so that they are capable of communicating with each other, and by loading the object across the platforms of the plural weighing scales. In a case in which there are plural objects to be weighed and in which a user wishes to simultaneously acquire individual information (a weight value, proportion of one object in the total weight of the plural objects, etc.) of each object, the weight of such an object to be weighed can be easily measured by having plural weighing scales (as many as required for weighing the plural objects) in a state in which they are capable of communicating with each other, and by loading each of the objects on one of the platforms of the plural weighing scales.

Preferably, the above weighing scale is one made up of serially connectable weighing scales, one of the plural weighing scales serving as a master (main) weighing scale and the others serving as client (subordinate) weighing scales; the determiner, in a case of determining that the weighing scale is capable of communicating with another weighing scale, additionally determines whether the weighing scale is the master weighing scale or a client weighing scale; the controller, in a case in which it is determined by the determiner that the weighing scale is the master weighing scale, aggregates the weight data output by the weighing scale and the weight data of the another weighing scale received via the communication unit, to cause information based on the aggregated weight data to be displayed on the display unit of the weighing scale; and the controller, in a case in which it is determined by the determiner that the weighing scale is the client weighing scale, transmits the weight data output by the weight measurer of the weighing scale to the master weighing scale via the communication unit.

In this case, because all pieces of weight data from plural weighing scales are aggregated by a master weighing scale and are displayed on a display unit of the master weighing scale, there is an advantage in that, by simply viewing the display unit of the master weighing scale, a user can easily know a measurement result. Furthermore, when this embodiment is compared with a configuration (such as shown in FIG. 12) in which each weighing scale separately outputs the weight data thereof to another processing apparatus, at which the pieces of weight data of the weighing scales are aggregated for display, the configuration can be simplified because there is no need to provide such a processing apparatus for aggregating and displaying the pieces of weight data of the weighing scales.

In a preferred embodiment, the another weighing scale is, from among the serially connectable weighing scales, either superior (at a superior or higher status) or subordinate (at a subordinate or lower status) in relation to the weighing scale, the determiner determines that the weighing scale is the master weighing scale when the weighing scale is not capable of communicating with a superior weighing scale and when the weighing scale is capable of communicating with a subordinate weighing scale, whereas the determiner determines that the weighing scale is the client weighing scale when the weighing scale is capable of communicating with a superior weighing scale and when the weighing scale is not capable of communicating with a subordinate weighing scale. Preferably, the weighing scale of the first embodiment additionally has a start signal transmitter for transmitting a start signal to the another weighing scale, and the determiner determines that the weighing scale is the master weighing scale in a case in which it is detected that a start switch for starting the operation of the weighing scale has been switched to be in an on state, and the start signal transmitter transmits the start signal to the another weighing scale in a case in which it is determined by the determiner that the weighing scale is the master weighing scale (first embodiment).

According to this embodiment, even in a case in which the start switch of a client weighing scale is operated to be in an on state, the start signal transmitter of this client weighing scale does not transmit a start signal to another weighing scale. Therefore, a situation can be avoided in which each weighing scale is switched to be in an operable state due to a user's erroneous operation.

Preferably, the weighing scale additionally has a start signal transmitter for transmitting a start signal to the another weighing scale; the determiner determines whether the weighing scale is the master weighing scale or the client weighing scale in a case in which it is detected that a start switch for starting the operation of the weighing scale has been switched to be in an on state; the start signal transmitter transmits the start signal to the another weighing scale in a case in which it is determined by the determiner that the weighing scale is the master weighing scale; the start signal transmitter, when it is determined by the determiner that the weighing scale is the client weighing scale and when it is determined that the weighing scale is capable of communicating with a subordinate weighing scale, transmits the start signal to each of the superior weighing scale and the subordinate weighing scale; and the start signal transmitter, when it is determined by the determiner that the weighing scale is the client weighing scale and when it is determined that the weighing scale is not capable of communicating with a subordinate weighing scale, transmits the start signal to the superior weighing scale (second embodiment).

According to this embodiment, the start signal transmitter of this weighing scale transmits a start signal to another weighing scale even in a case in which the start switch of a master weighing scale is operated to be switched to be in an on state, and even in a case in which the start switch of a client weighing scale is operated to be switched to be in an on state. Therefore, there is an advantage in that the start switch of any weighing scale can be operated to be in an on state so as to place each of the weighing scales in an operable state.

In another preferred embodiment, the determiner determines that the weighing scale is the master weighing scale in a case in which it is detected that a start switch for starting the operation of the weighing scale has been switched to be in an on state, and the determiner determines that the weighing scale is the client weighing scale in a case in which the receipt of a start signal is detected. Preferably, the weighing scale of this embodiment additionally has a start signal transmitter for, in a case in which it is determined by the determiner that the weighing scale is the master weighing scale, transmitting a start signal to the another weighing scale (third embodiment).

According to this embodiment, from among the plural weighing scales, only the weighing scale for which the start switch has been operated to be switched to be in an on state can be the master weighing scale. Therefore, there is an advantage in that a user can easily select the weighing scale at which the pieces of weight data of the plural weighing scales are to be aggregated.

BRIEF DESCRIPTION OF THE DRAWINGS

FIGS. 4 and 5 provide a single flowchart collectively showing a procedure of an operation when a start switch is turned on.

FIG. 9 is a diagram showing an example of a display.

FIG. 10 is a diagram showing an example of a display.

FIG. 11 is a diagram showing an example of a display.

FIG. 13 is a flowchart showing an operation of a weighing scale according to a second embodiment of the present invention when the start switch is turned on.

FIG. 16 is a flowchart showing an operation of a weighing scale according to a third embodiment of the present invention when the start switch is turned on.

DETAILED DESCRIPTION OF PREFERRED EMBODIMENTS

A: First Embodiment

A-1: Configuration

Figure 1:
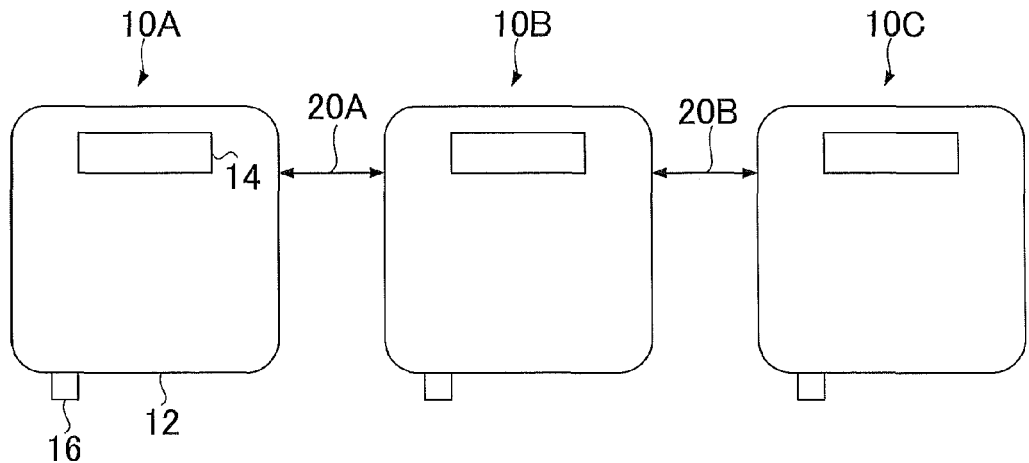
FIG. 1 is a plane view showing an external view of weighing scales according to a first embodiment of the present invention.

FIG. 1 is a plane view showing an external view of weighing scales (10A, 10B, and 10C) according to a first embodiment of the present invention. As shown in FIG. 1, each weighing scale (10A, 10B, and 10C) is provided with a platform 12. A human subject, as an object to be weighed, steps on platform 12, or an object to be weighed is loaded on platform 12, so that the weight thereof can be measured. Provided on platform 12 are a display unit 14 and a start switch 16. Furthermore, weighing scales 10A and 10B are connected via a communication cable 20A in a state in which communication can be performed therebetween; and weighing scale 10B and weighing scale 10C are connected via a communication cable 20B in a state in which communication can be performed therebetween.

Figure 2:
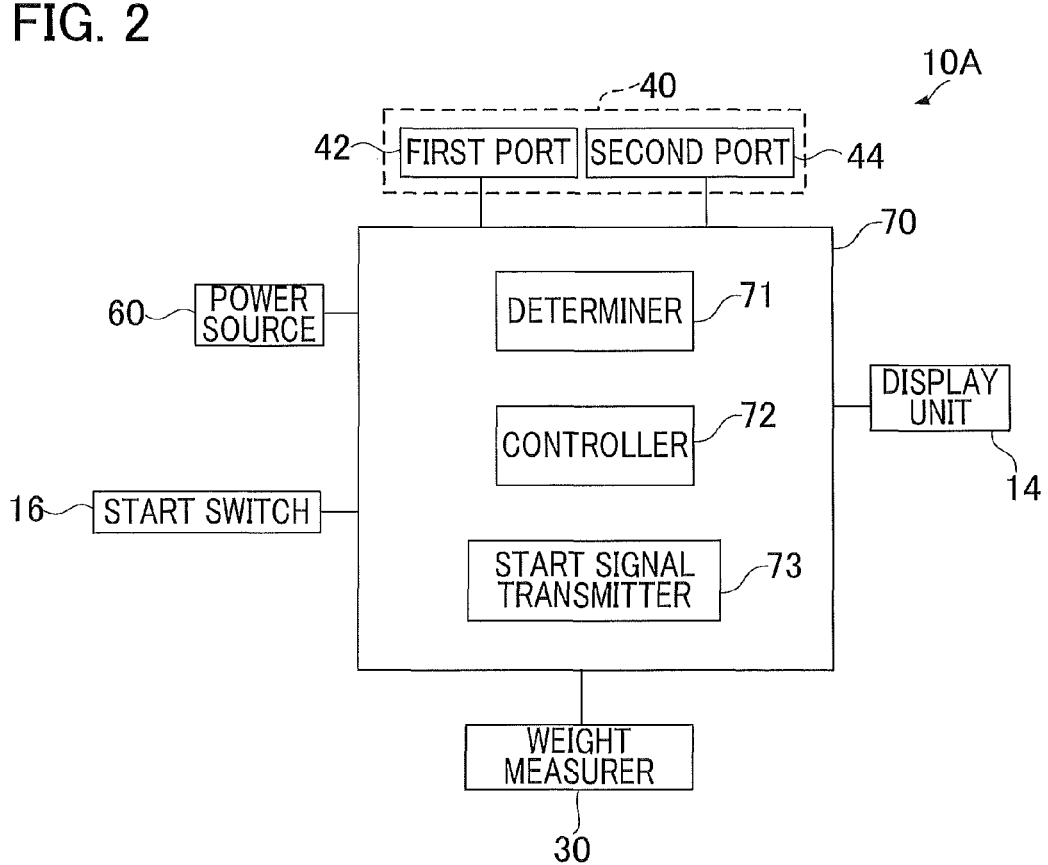
FIG. 2 is a diagram showing a detailed configuration of the weighing scale according to the embodiment.

FIG. 2 is a diagram showing a detailed configuration of weighing scale 10A. The configuration of weighing scale 10B and 10C each is the same as that of weighing scale 10A. As shown in FIG. 2, inside platform 12 of weighing scale 10A are a weight measurer 30 (for example, a load cell and a weight detection circuit), a display unit 14 (for example, an LCD), a communication unit 40, a power source 60, a start switch 16, and a microcomputer 70.

A weight measurer 30 is a means for measuring the weight of an object to be weighed loaded on the platform, to output a measured result as weight data.

Display unit 14 is a means for displaying weight data as a measurement result.

Communication unit 40 is a means for performing communication with at least one of a superior weighing scale and a subordinate weighing scale. In the present embodiment, communication unit 40 includes a first port 42 for performing communication with a superior weighing scale and a second port 44 for performing communication with a subordinate weighing scale.

Power source 60 is a means for supplying electricity to each unit of the electric system of this weighing scale.

Start switch 16 is a means for starting an operation of this weighing scale.

Microcomputer 70 is provided with a CPU, a ROM that has stored therein a computer program for control and calculation, a RAM for storing weight data obtained by measurement or by communication and other calculation results, a timer, and an IO port, etc., to perform various processes such as calculation, determination, and control.

In a case in which plural weighing scales are serially connected in a line to form a weighing scale system, and in which the reference is on one of the weighing scales, the "superior weighing scale" is one which is located at a position that is on the side of one end (upper termination side), in relation to the reference weighing scale, of this weighing scale system. Similarly, in a case in which plural weighing scales are connected in a line to form a weighing scale system, and in which the reference is on one of the weighing scales, the "subordinate weighing scale" is one which is located at a position that is on the side of the other end (lower termination side), in relation to the reference weighing scale, of this weighing scale system. In the present embodiment, description will be given assuming that weighing scale 10A is at one end (upper termination) of the weighing scale system, and that weighing scale 10C is at the other end (lower termination) of the weighing scale system. For example, when the reference is on weighing scale 10B, weighing scale 10A is a superior weighing scale; and weighing scale 10C is a subordinate weighing scale. That is, weighing scale 10A is a superior weighing scale in relation to weighing scale 10B; weighing scale 10B is a subordinate weighing scale in relation to weighing scale 10A and is a superior weighing scale in relation to weighing scale 10C; and weighing scale 10C is a subordinate weighing scale in relation to weighing scale 10B.

Microcomputer 70 has a determiner 71, a controller 72, and a start signal transmitter 73. Determiner 71 has a function of determining whether this weighing scale is capable of communicating with another weighing scale via communication unit 40. More specifically, determiner 71 determines whether this weighing scale is capable of communicating with a superior weighing scale via first port 42; and determines whether this weighing scale is capable of communicating with a subordinate weighing scale via second port 44. Determiner 71 has a function of, in a case in which this weighing scale is capable of communicating with another weighing scale, additionally determining whether this weighing scale is a master weighing scale or a client weighing scale. The "master weighing scale" is a weighing scale (first weighing scale) that receives weight data of at least one weighing scale (including a second weighing scale) via communication unit 40, and aggregates the received pieces of weight data of the at least one weighing scale and the weight data of this weighing scale (the first weighing scale), for display on display unit 14 of the first weighing scale. On the other hand, a "client weighing scale" is a weighing scale (second weighing scale) that transmits via communication unit 40 weight data of this second weighing scale, or the weight data of this second weighing scale and weight data of another weighing scale (third weighing scale) received via communication unit 40 to still another weighing scale (i.e., a weighing scale that is not another weighing scale (the third weighing scale) which has transmitted weight data to the second weighing scale) (i.e., the first weighing scale serving as a master weighing scale). In this embodiment, weighing scale 10A serves as a master weighing scale; and weighing scales 10B and 10C serve as client weighing scales. In other words, a weighing scale that is at the upper termination serves as a master weighing scale.

Controller 72 has a function of, in a case in which a result of determination by determiner 71 indicates that this weighing scale cannot communicate with another weighing scale, controlling weight data output by weight measurer 30 to be displayed on display unit 14 and of, in a case in which a result of determination by determiner 71 indicates that this weighing scale is capable of communicating with another weighing scale, transmitting weight data to, or receiving from, the another weighing scale. Controller 72 additionally has a function of, in a case in which it is determined by determiner 71 that this weighing scale is a master weighing scale, aggregating weight data output by weight measurer 30 of this weighing scale and weight data of another weighing scale received via communication unit 40, for display on display unit 14 of this weighing scale, whereas, in a case in which it is determined by determiner 71 that this weighing scale is a client weighing scale, of transmitting weight data output by weight measurer 30 of this weighing scale to a master weighing scale via communication unit 40.

Start signal transmitter 73 has a function of transmitting a start signal to another weighing scale. The "start signal" is a signal for starting the operation of this weighing scale. Microcomputer 70, by executing a predetermined computer program, carries out the above functions 71 to 73. It is to be noted that microcomputer 70 is merely an example, and the type of hardware for implementing the above functions 71 to 73 can be freely selected. In short, any hardware for enabling the implementation of the functions 71 to 73 by executing a predetermined computer program can be selected.

Figure 3:
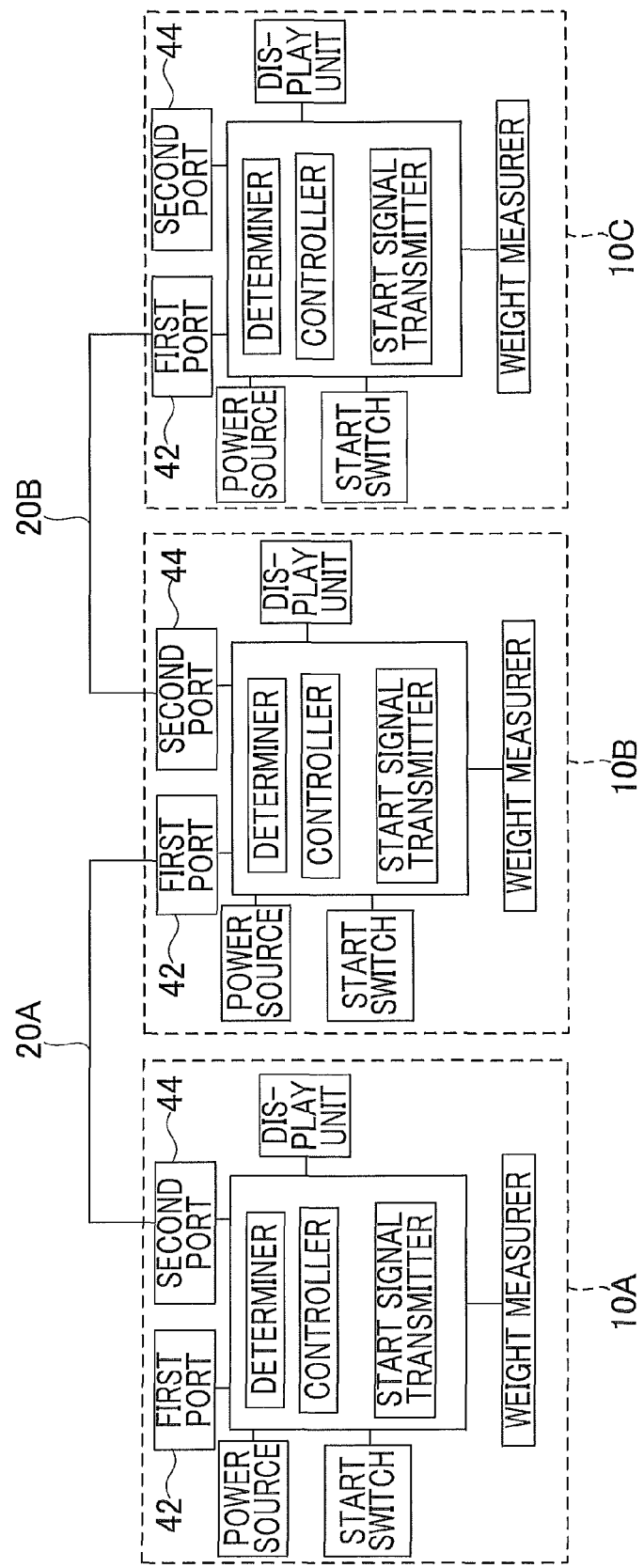
FIG. 3 is a diagram showing how plural weighing scales are connected to each other.

FIG. 3 is a diagram specifically showing how plural weighing scales 10 are connected to each other. As shown in FIG. 3, no communication cable is connected to first port 42 of weighing scale 10A, and therefore, weighing scale 10A is in a state in which communication with a superior weighing scale cannot be performed via first port 42. On the other hand, second port 44 of weighing scale 10A and first port 42 of weighing scale 10B are connected via communication cable 20A, which means that weighing scales 10A and 10B are in a state in which they are capable of communicating with each other. Furthermore, second port 44 of weighing scale 10B and first port 42 of weighing scale 10C are connected via communication cable 20B, which means that weighing scales 10B and 10C are in a state in which they are capable of communicating with each other. Furthermore, no communication cable is connected to second port 44 of weighing scale 10C, and therefore, weighing scale 10C is in a state in which communication with a subordinate weighing scale cannot be performed via second port 44.

Figure 4:
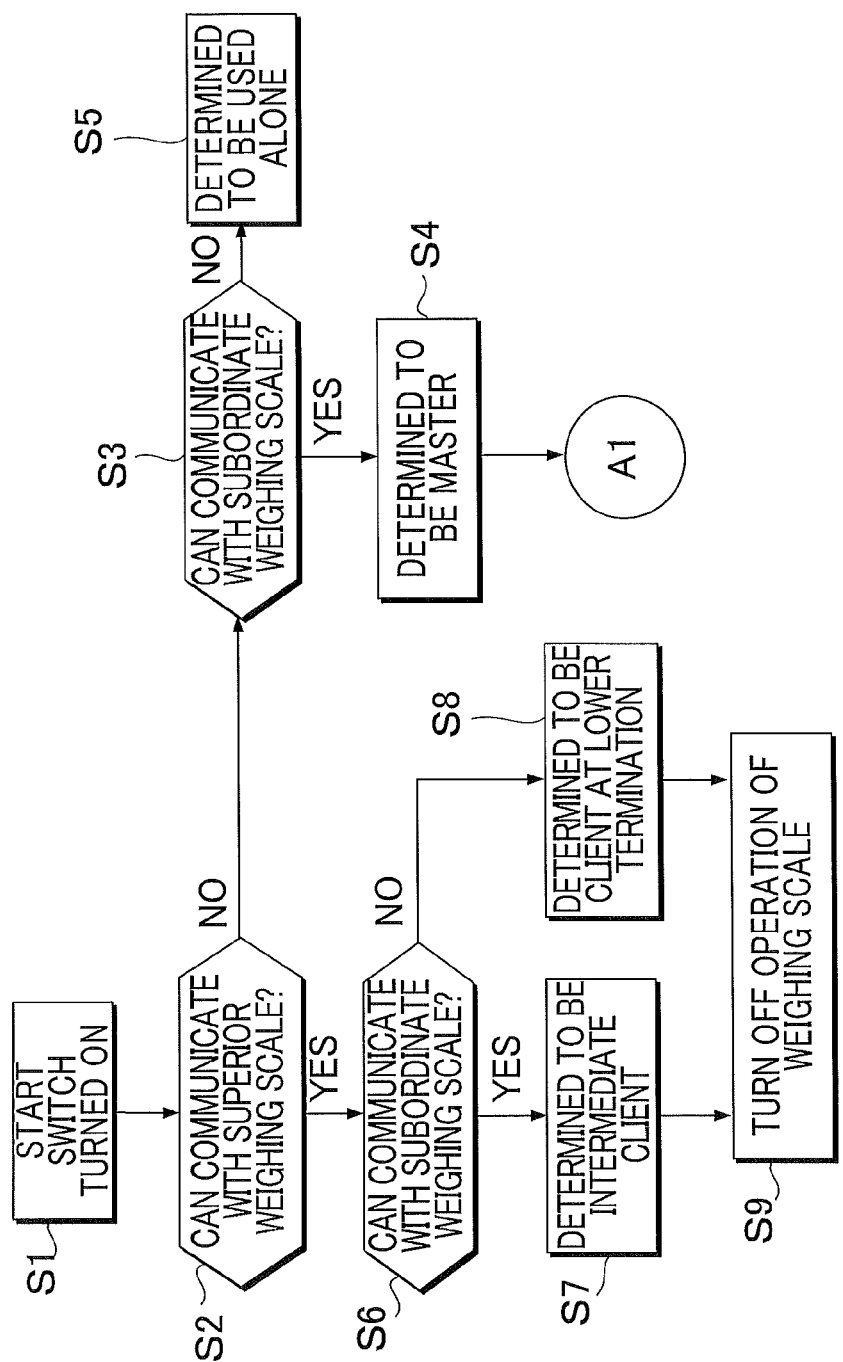

A-2: Operation of a Weighing Scale when Start Switch of Weighing Scale is Turned on Description will now be given of an operation of a weighing scale in a case in which start switch 16 of the weighing scale is switched to be an on state, the weighing scale being one of weighing scales connected with each other. FIG. 4 is a flowchart showing a detailed operation of a weighing scale when start switch 16 thereof is operated to be turned on. First, in a case in which start switch 16 of one of the weighing scales is turned on by a user (Step S1), electricity is supplied from power source 60 to each unit of the electric system of this weighing scale. Determiner 71 of microcomputer 70 of this weighing scale, once it detects that start switch 16 is operated so that it is switched to be in an on state, determines whether this weighing scale is a master weighing scale, a client weighing scale, or is used alone. In the present embodiment, determiner 71 determines that this weighing scale is a master weighing scale in a case in which this weighing scale is not capable of communicating with a superior weighing scale but is capable of communicating with a subordinate weighing scale, whereas determiner 71 determines that this weighing scale is a client weighing scale in a case in which this weighing scale is capable of communicating with a superior weighing scale. In the following, a detailed description thereof will be given.

When electricity is supplied from power source 60 to each unit of the electric system of this weighing scale, microcomputer 70 determines whether this weighing scale is capable of communicating with a superior weighing scale (Step S2). In the present embodiment, microcomputer 70 detects whether communication cable 20 is connected to first port 42, thereby to determine whether this weighing scale is capable of communicating with a superior weighing scale. More specifically, for example, microcomputer 70 transmits, from first port 42 of this weighing scale, a transmission signal for connection confirmation, and, in a case in which a reply signal is detected, determines that this weighing scale is capable of communicating with a superior weighing scale. On the other hand, in a case in which microcomputer 70 does not detect the receipt of a reply signal for connection confirmation, this weighing scale determines that this weighing scale is not capable of communicating with a superior weighing scale.

In a case in which a result of the determination in Step S2 changes to the negative, microcomputer 70 determines whether this weighing scale is capable of communicating with a subordinate weighing scale (Step S3). In the present embodiment, microcomputer 70 detects whether communication cable 20 is connected to second port 44, thereby to determine whether this weighing scale is capable of communicating with a subordinate weighing scale. More specifically, for example, microcomputer 70 transmits a transmission signal for connection confirmation from second port 44 of this weighing scale, and, in a case of detecting a reply signal for connection confirmation, determines that this weighing scale is capable of communicating with a subordinate weighing scale. On the other hand, in a case in which microcomputer 70 does not detect receipt of a reply signal for connection confirmation within a certain time period, this weighing scale determines that this weighing scale is not capable of communicating with a subordinate weighing scale.

In a case in which a result of the determination in Step S3 changes to the affirmative, microcomputer 70 determines that this weighing scale is a master weighing scale (Step S4), and the process advances to Step S10 (described below).

On the other hand, in a case in which a result of the determination in Step S3 changes to the negative, microcomputer 70 determines that this weighing scale is used alone (Step S5). The process then advances to an operation described below in the section A-6, "operation of weighing scale when used alone".

Furthermore, in a case in which a result of determination in Step S2 changes to the affirmative, microcomputer 70 determines whether this weighing scale is capable of communicating with a subordinate weighing scale (Step S6). In the present embodiment, microcomputer 70 detects whether communication cable 20 is connected to second port 44, thereby to determine whether this weighing scale is capable of communicating with a subordinate weighing scale. More specifically, for example, microcomputer 70 transmits, from second port 44 of this weighing scale, a transmission signal for connection confirmation, and in a case of detecting a reply signal for connection confirmation, determines that this weighing scale is a client weighing scale located at a position other than the lower termination (intermediate) (Step S7). Microcomputer 70 then switches the operation of this weighing scale to be in an off state (to a state before the start switch was turned on) (Step S9). On the other hand, in a case in which the receipt of a reply signal for connection confirmation is not detected, this weighing scale determines that this weighing scale is a client weighing scale located at the lower termination (Step S8), and turns the operation of this weighing scale to an off state (to a state before the start switch was turned on) (Step S9).

Figure 5:
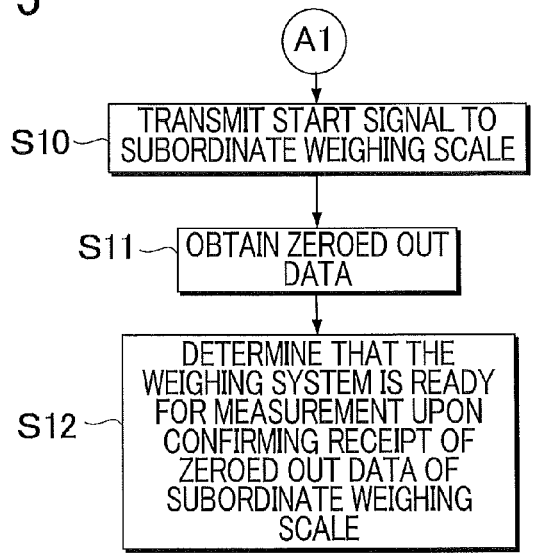

FIG. 5 is a flowchart showing an operation performed after Step S4 in FIG. 4. In the present embodiment, start signal transmitter 73 of microcomputer 70 determines that, in a case in which it is determined by determiner 70 that this weighing scale is a master weighing scale, transmits a start signal to another weighing scale. More specifically, after Step S4, microcomputer 70 of a weighing scale that has been determined as the master weighing scale transmits, from second port 44 of this weighing scale, a start signal to a subordinate weighing scale (Step S10). Microcomputer 70 of this weighing scale obtains zeroed out data (weight data of when no object to be weighed is loaded on a platform of this weighing scale) by weight measurer 30 of this weighing scale (Step S11). Microcomputer 70 of this weighing scale waits for receipt of zeroed out data from a subordinate weighing scale via second port 44, and in a case in which it confirms receipt of zeroed out data of a subordinate weighing scale, determines that a connected line of weighing scales, as a system (weighing system), is ready for weight measurement (Step S12). In the present embodiment, the process of Step S11 is performed after the process of Step S10, but this is not limited thereto. Alternatively, the process of Step S11 may be performed before the process of Step S10. In another alternative, the process of Step S10 and the process of Step S11 may be performed simultaneously.

Figure 6:
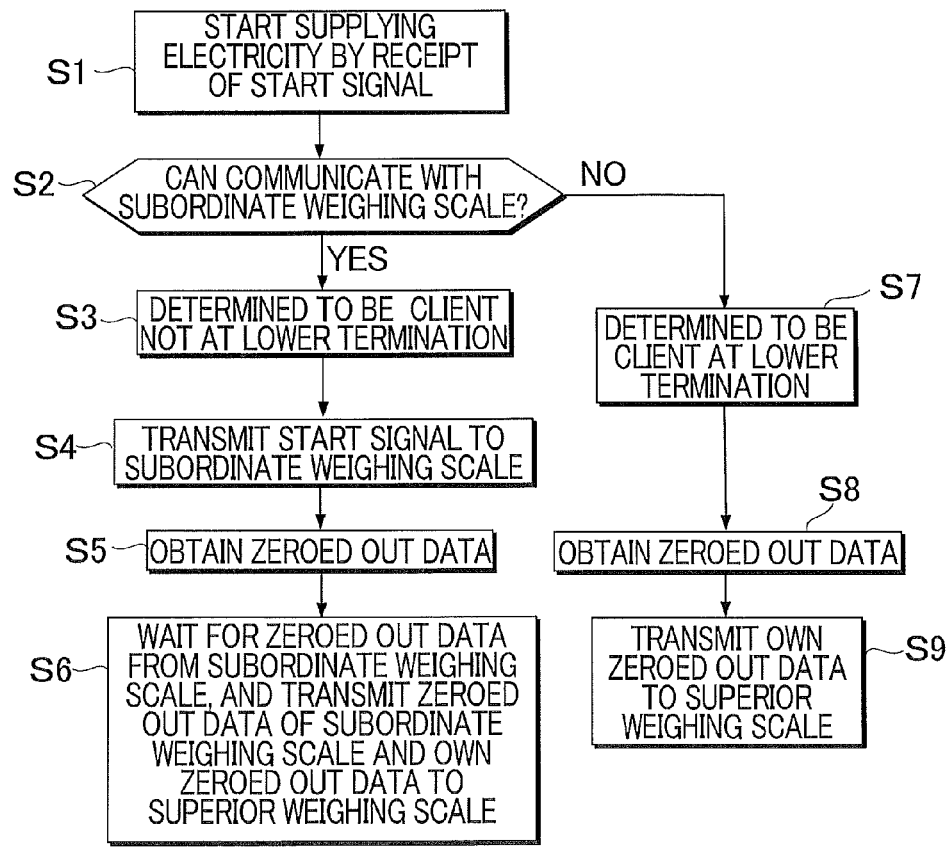
FIG. 6 is a flowchart showing an operation upon receiving a start signal.

A-3. Operation of Weighing Scale Upon Receiving Start Signal from Superior Weighing Scale Description will next be given of an operation of a weighing scale upon receiving a start signal from a superior weighing scale. FIG. 6 is a flowchart showing a detailed operation performed by the weighing scale upon receiving a start signal. Upon receiving a start signal from a superior weighing scale, electricity is supplied to each unit of the electric system of this weighing scale from power source 60 of this weighing scale (Step S1). Determiner 71 of microcomputer 70 of this weighing scale, upon detecting receipt of a start signal, determines whether this weighing scale is a client weighing scale not at the lower termination or a client weighing scale at the lower termination. Start signal transmitter 73 of microcomputer 70 of this weighing scale, in a case in which it is determined by determiner 71 that this weighing scale is a client weighing scale not at the lower termination, transmits the received start signal to a subordinate weighing scale, whereas, in a case in which it is determined by determiner 71 that this weighing scale is a client weighing scale at the lower termination, does not transmit the received start signal to another weighing scale. A detailed description thereof follows.

In a case in which electricity is supplied from power source 60 to each unit of the electric system of this weighing scale by receipt of a start signal, microcomputer 70 of this weighing scale determines whether this weighing scale is capable of communicating with a subordinate weighing scale (Step S2). In the present embodiment, microcomputer 70 detects that communication cable 20 is connected to second port 44, thereby to determine whether this weighing scale is capable of communicating with a subordinate weighing scale. More specifically, for example, microcomputer 70 transmits a transmission signal for connection confirmation from second port 44 of this weighing scale, and in a case of detecting a reply signal for connection confirmation, determines that this weighing scale is capable of communicating with a subordinate weighing scale. On the other hand, in a case in which a reply signal for connection confirmation is not detected within a predetermined period, microcomputer 70 determines that this weighing scale is not capable of communicating with a subordinate weighing scale.

In a case in which a result of the determination in Step S2 changes to the affirmative, microcomputer 70 of this weighing scale determines that this weighing scale is a client weighing scale located at a position other than the lower termination (intermediate) (Step S3), to transmit from second port 44 of this weighing scale a start signal to a subordinate weighing scale (Step S4). Subsequently, microcomputer 70 of this weighing scale obtains zeroed out data based on the output from weight measurer 30 of this weighing scale (Step S5).

Microcomputer 70 of this weighing scale waits for receipt of zeroed out data of a subordinate weighing scale from second port 44 of this weighing scale, and upon receiving zeroed out data of a subordinate weighing scale, transmits the received zeroed out data and the zeroed out data of this weighing scale to a superior weighing scale (Step S6). In the present embodiment, the process of Step S5 is performed after the process of Step S4, but this is not limited thereto. Alternatively, the process of Step S5 may be performed before the process of Step S4. In another alternative, the process of Step S4 and the process of Step S5 may be performed simultaneously.

On the other hand, in a case in which a result of the determination in Step S2 changes to the negative, microcomputer 70 of this weighing scale determines that this weighing scale is a client weighing scale located at the lower termination (Step S7), and obtains zeroed out data output from weight measurer 30 of weighing scale (Step S8), to transmit the zeroed out data of this weighing scale to a superior weighing scale (Step S9).

A-4: Detailed Operation in the Present Embodiment

Figure 7:
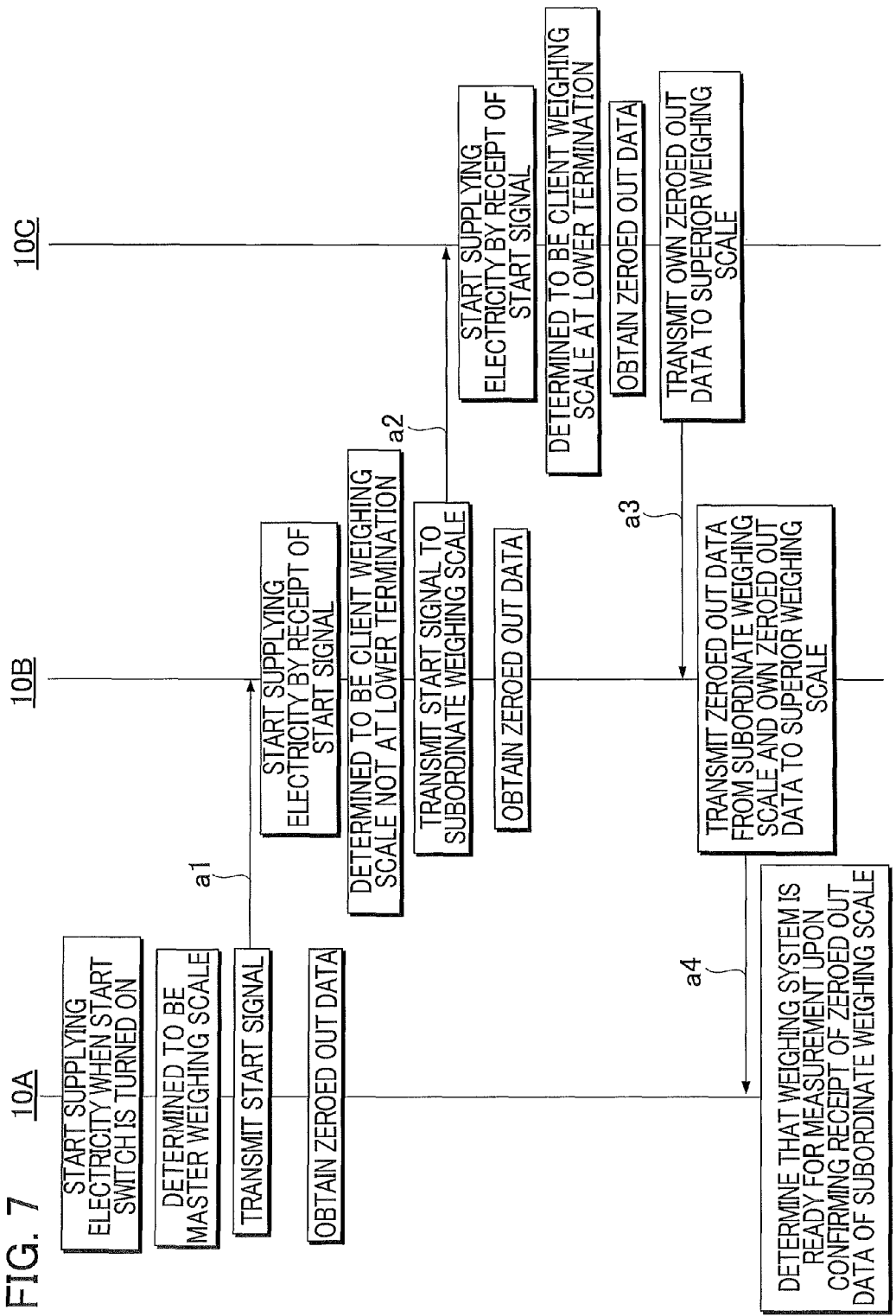
FIG. 7 is a sequence chart showing a detailed operation of each weighing scale.

FIG. 7 is a sequence chart showing a detailed operation of each weighing scale (10A, 10B, and 10C) in a case in which start switch 16 of weighing scale 10A is turned on. In the following, the reference is made to FIG. 7 in describing detailed operation of the present embodiment.

When start switch 16 of weighing scale 10A is first turned on, weighing scale 10A determines that this weighing scale is a master weighing scale after performing the processes of Steps S1→S2→S3→S4 in FIG. 4.

Weighing scale 10A then performs the process of Step S10 in FIG. 5, thereby to transmit a start signal to weighing scale 10B (a1 shown in FIG. 7). Weighing scale 10A then obtains zeroed out data output from weight measurer 30, to enter a standby state.

Weighing scale 10B, upon receiving the start signal from weighing scale 10A, performs the processes of Step S1→S2→S3 in FIG. 6, to determine that this weighing scale is a client weighing scale located at a position other than the lower termination (intermediate position).

Weighing scale 10B then performs the process of Step S4 in FIG. 6, thereby to transmit a start signal to weighing scale 10C (a2 shown in FIG. 7). Weighing scale 10B then obtains zeroed out data output from weight measurer 30, to enter a standby state.

Weighing scale 10C, upon receiving a start signal from weighing scale 10B, performs the processes of Steps S1, S2 and S7 in FIG. 6, to determine that this weighing scale is a client weighing scale located at the lower termination.

Then, this weighing scale 10C performs the processes of Steps S8 and S9 in FIG. 6, thereby to obtain zeroed out data output from weight measurer 30 of weighing scale 10C. Weighing scale 10C then transmits the zeroed out data of this weighing scale to weighing scale 10B (a3 shown in FIG. 7). The process then advances to the section A-5, "weight measurement process", described below.

Weighing scale 10B, upon receiving from weighing scale 10C the zeroed out data thereof while being in a standby state, performs the process of Step S6 in FIG. 6, in which weighing scale 10B transmits the zeroed out data of weighing scale 10C and that of weighing scale 10B to weighing scale 10A (a4 shown in FIG. 7). The process then advances to the section A-5, "weight measurement process" described below.

Weighing scale 10A, upon receiving from weighing scale 10B the zeroed out data of weighing scale 10B and the zeroed out data of weighing scale 10C while being in a standby state, performs the process of Step S12 in FIG. 5. Weighing scale 10A determines that a line of connected weighing scales is ready for weight measurement. The process then advances to the section A-5, "weight measurement process", described below.

A-5: Weight Measurement Process

Figure 8:
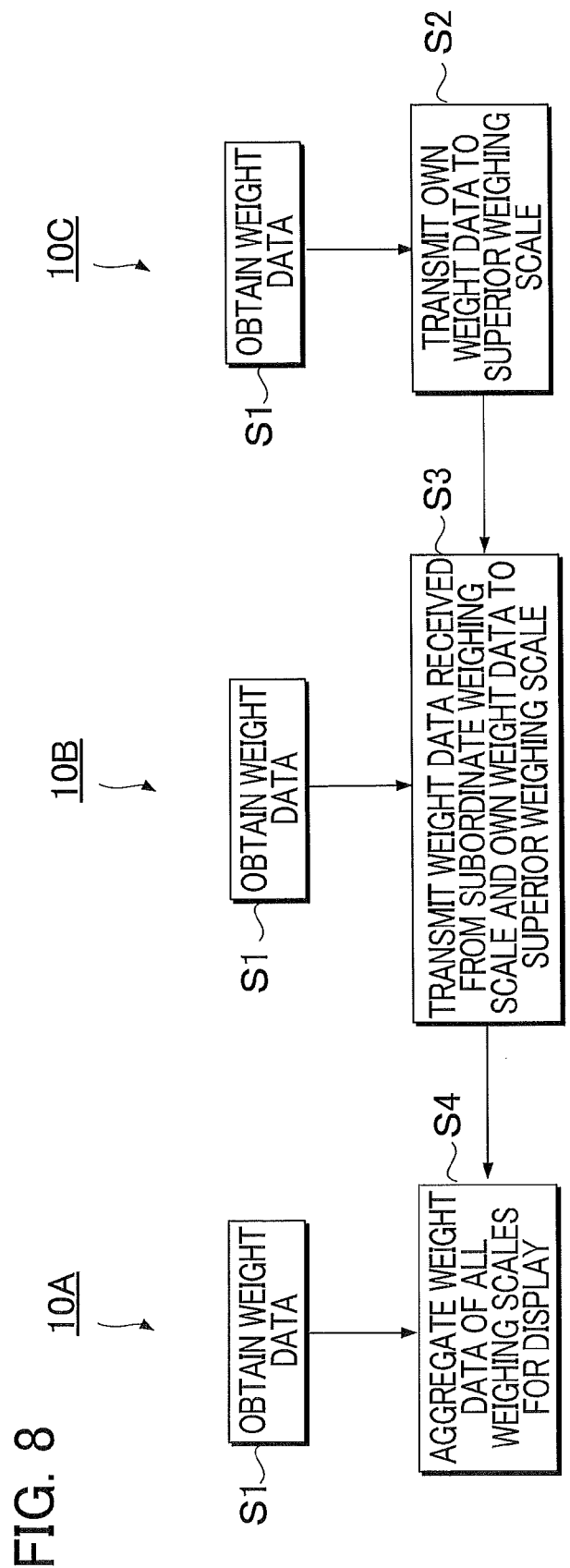
FIG. 8 is a diagram showing a weight measurement process.

Description will next be given of a weight measurement process performed in a case in which a human subject, as an object to be weighed, steps on, or an object to be weighed is loaded on, all of platforms 12 of the weighing scales (10A, 10B, and 10C) of the present embodiment, the weight measurement process being performed after each weighing scale (10A, 10B, and 10C) is ready for weight measurement as shown in FIG. 7. FIG. 8 is a chart diagram showing details of this weight measurement process. Microcomputer 70 of each weighing scale (10A, 10B, and 10C) first controls weight measurer 30 of each weighing scale to execute the measurement of the weight of an object to be weighed placed on platform 12 of each weighing scale, to output as weight data (Step S1).

The microcomputer of the client weighing scale 10C at the lower termination then transmits the weight data indicating the weight measured by weight measurer 30 of weighing scale 10C via first port 42 to superior weighing scale 10B (Step S2).

The microcomputer of client weighing scale 10B, which is not at the lower termination, upon receiving weight data from subordinate weighing scale 10C via second port 44, transmits the received weight data and the weight data of this weighing scale 10B via first port 42 to superior weighing scale 10A (Step S3). More specifically, for example, the microcomputer of weighing scale 10B, upon receiving weight data from subordinate weighing scale 10C via second port 44, generates serial data by serially appending the received weight data to the weight data output from weight measurer 30 of this weighing scale 10B, to transmit this serial data via first port 42 to superior weighing scale 10A. In the present embodiment, the microcomputer of weighing scale 10B appends the weight data of weighing scale 10C received via second port 44 to the tail end of the weight data of weighing scale 10B.

The microcomputer of master weighing scale 10A, upon receiving weight data from subordinate weighing scale 10B via second port 44, aggregates the received weight data and the weight data of this weighing scale 10A, for display on display unit 14 of this weighing scale 10A (Step S4). More specifically, for example, the microcomputer of weighing scale 10A, upon receiving the weight data in a serial form from subordinate weighing scale 10B via second port 44, determines the weight data of weighing scale 10B from the first half portion of the received serial data, and determines the weight data of weighing scale 10C from the second half portion of the serial data, to display information represented by the determined weight data of weighing scale 10B, the determined weight data of weighing scale 10C, and the weight data of weight measured by weight measurer 30 of weighing scale 10A on display unit 14 of this weighing scale 10A.

There are various modes of displaying information represented by or derived from the above pieces of the weight data, which can be freely selected. A case is assumed in which the weight data of weighing scale 10C shows "40 kg", in which the weight data of weighing scale 10B is "10 kg", and in which the weight data of weighing scale 10A shows "30 kg". For example, in a mode of displaying on display unit 14 the total weighed value of all the weighing scales, the sum of weight by adding up the weight indicated by all pieces of weight data of all of the weighing scales, "80 kg" is displayed on display unit 14 of master weighing scale 10A as shown in FIG. 9. Alternatively, as shown in FIG. 10, the weight indicated by weight data of each weighing scale can be separately displayed. In another alternative mode, as shown in FIG. 11, the proportion of weight indicated by each weight data of each weighing scale in the total weighed value, which is the sum of the weight indicated by all pieces of weight data of all of the weighing scales, can be displayed.

As described in the foregoing, according to the first embodiment, for example, in a case in which the area of an object to be weighed is so large that the object cannot be loaded on the platform of one weighing scale alone (or the platforms of two weighing scales) or in a case in which an object to be weighed is too heavy to be weighed by one weighing scale (or two weighing scales), the object to be weighed can be easily measured by loading the object to be weighed across an area covering all the platforms of each weighing scale (10A, 10B, and 10C). In a case in which an object to be weighed has plural units and in which a person wishes to simultaneously obtain separate information (weight value, the proportion of one unit in the entire object) on each unit of the object to be weighed, the weight of the object to be weighed can be easily measured by loading the object to be weighed separately on the platforms of weighing scales (10A, 10B, and 10C).

Furthermore, the weight data of each weighing scale (10A, 10B, and 10C) is aggregated by, and information represented by or derived from the aggregated weight data (information based on the aggregated data) are displayed at the master weighing scale 10A. Therefore, there is an advantage in that a user can readily know the measurement result simply by viewing the display unit 14 of master weighing scale 10A.

Furthermore, in the present embodiment, even in a case in which the start switch of client weighing scale 10B or 10C is operated so as to be turned on, weighing scale 10B or 10C is eventually turned off when it is determined that the activated weighing scale is a client weighing scale at the lower termination or a client weighing scale not at the lower termination. Therefore, the line of connected weighing scales does not operate as a system even if the start switch of client weighing scale 10B or 10C is operated to be turned on. Instead, the line of connected weighing scales operates as a system only when the start switch of master weighing scale 10A is operated so as to be turned on. Therefore, in a case of using the weighing scale of the present embodiment by connecting a plurality of the weighing scales for use as a system, there is advantage in that an erroneous activation can be prevented because only the start switch of the master weighing scale is used to activate the system.

Figure 12:
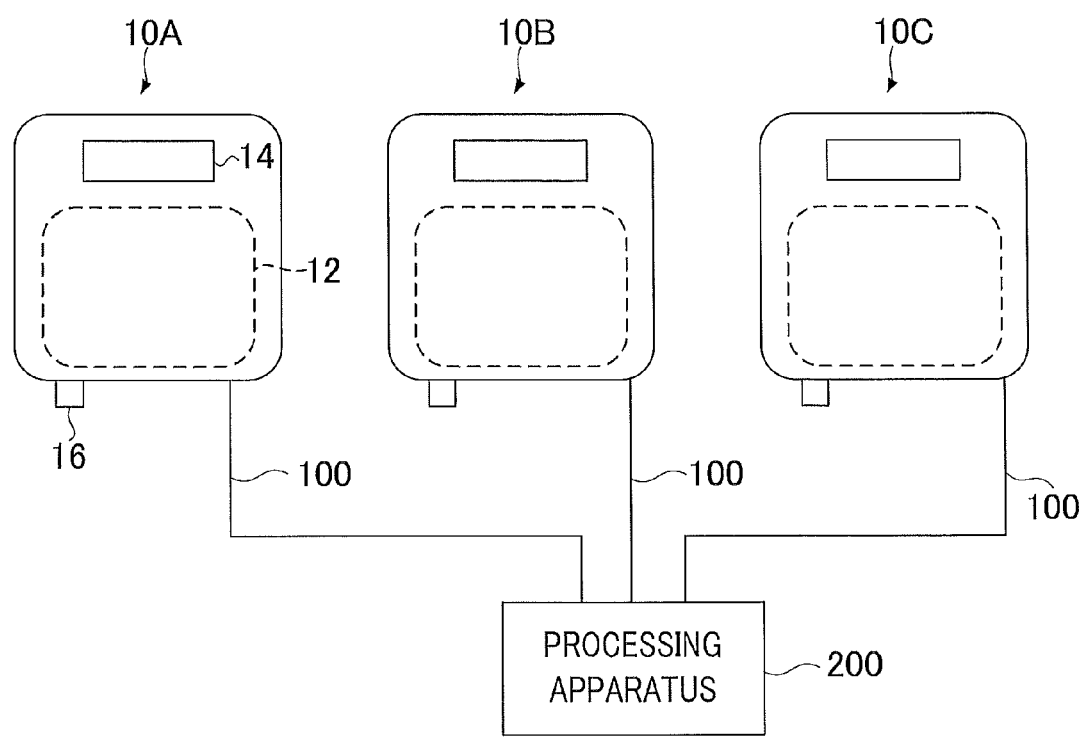
FIG. 12 is a diagram showing a schematic configuration of a comparison example.

FIG. 12 is a simplified configuration of a conventional embodiment in which the weight data of each weighing scale (10A, 10B, and 10C) is aggregated by and displayed at a processing apparatus 200 other than a weighing scale (hereinafter referred to as a "comparison example"). As shown in FIG. 12, in the comparison example, the weight data of each weighing scale is separately transmitted via an output cable 100 to processing apparatus 200. Processing apparatus 200 then aggregates the weight data of each weighing scale for display. In contrast, in the present embodiment, the weight data of each weighing scale (10A, 10B, and 10C) is aggregated by and displayed at master weighing scale 10A. Therefore, there is no need to provide processing apparatus 200 for aggregating and displaying the weight data of each weighing scale in addition to weighing scales as in a comparison example. Thus, there is an advantage in that, according to the present embodiment, the configuration can be simplified in comparison with the comparison example.

A-6: Operation of Weighing Scale when Used Alone

Brief description will next be given of an operation of a weighing scale in a case in which it is determined that the weighing scale is used alone (Step S5 shown in FIG. 4) when start switch 16 thereof is operated to be turned on. A case is assumed in which communication cable 20A is not connected to second port 44 of the above weighing scale 10A.

In Step S5 shown in FIG. 4, in a case in which weighing scale 10A is used alone, the microcomputer of weighing scale 10A obtains zeroed out data output from weight measurer 30 thereof.

In a case in which a human subject to be weighed subsequently steps on, or an object to be weighed subsequently is loaded on, platform 12 of weighing scale 10A, the microcomputer of this weighing scale 10A controls weight measurer 30 thereof to measure the weight of the object to output weight data.

B: Second Embodiment

Description will next be given of weighing scale (10A, 10B, and 10C) according to a second embodiment of the present invention. In the first embodiment, a line of connected weighing scales functions as a system only when start switch 16 of a master weighing scale is operated to be turned on, whereas in the second embodiment, a line of connected weighing scales functions as a system even when start switch 16 of a master or a client weighing scale is operated to be turned on. Detailed description follows.

B-1: Configuration

In the present embodiment, the external view of weighing scales (10A, 10B, and 10C) and how they are connected are the same as those of the above first embodiment, and are such as shown in FIGS. 1 and 3. As in the above first embodiment, determiner 71 of microcomputer 70 of each weighing scale according to the present embodiment, upon detecting that start switch 16 has been operated to be turned on, determines whether this weighing scale is a master weighing scale or a client weighing scale. Start signal transmitter 73 of microcomputer 70, in a case in which, as a result of the determination by determiner 71, it is determined that this weighing scale is a master weighing scale, transmits a start signal to a subordinate weighing scale. However, the weighing scale of the present embodiment differs from that of the first embodiment in that start signal transmitter 73 additionally has a function of, in a case in which, as a result of the determination by determiner 71, it is determined that this weighing scale is a client weighing scale and is capable of communicating with a subordinate weighing scale (i.e., in a case in which it is determined that this weighing scale is a client weighing scale not at the lower termination), transmitting a start signal to a superior weighing scale and the subordinate weighing scale. Furthermore, the weighing scale of the present embodiment differs from that of the first embodiment in that start signal transmitter 73 has a function of, in a case in which, as a result of the determination by determiner 71, it is determined that this weighing scale is a client weighing scale and is not capable of communicating with a subordinate weighing scale (i.e., in a case in which it is determined that this weighing scale is a client weighing scale at the lower termination), transmitting a start signal to a superior weighing scale.

Furthermore, determiner 71 according to the present embodiment, upon detecting receipt of a start signal, determines whether this weighing scale is a master weighing scale, a client weighing scale not at the lower termination, or a client weighing scale at the lower termination. Therefore, the weighing scale of the present embodiment differs from that of the first embodiment in that determiner 71 has a function of, upon detecting receipt of a start signal, determining whether this weighing scale is a master weighing scale. Start signal transmitter 73 according to the present embodiment, in a case in which, by a result of the determination by determiner 71, it is determined that this weighing scale is a client weighing scale at the lower termination, does not transmit the received start signal to another weighing scale in the same way as in the first embodiment. However, the weighing scale of the present embodiment differs from that of the first embodiment in that start signal transmitter 73 according to the present embodiment, in a case in which, by a result of determination by determiner 71, it is determined that this weighing scale is a master weighing scale, does not have a function of transmitting the received start signal to another weighing scale. Furthermore, the weighing scale of the present embodiment differs from that of the first embodiment in that start signal transmitter 73 according to the present embodiment has a function of, in a case in which by a result of determination by determiner 71, it is determined that this weighing scale is a client weighing scale not at the lower termination, transmitting the received start signal to either a superior weighing scale or a subordinate weighing scale that has not transmitted the start signal to this weighing scale.

B-2: Operation of Weighing Scale when Start Switch is Operated to be Turned on

Figure 13:
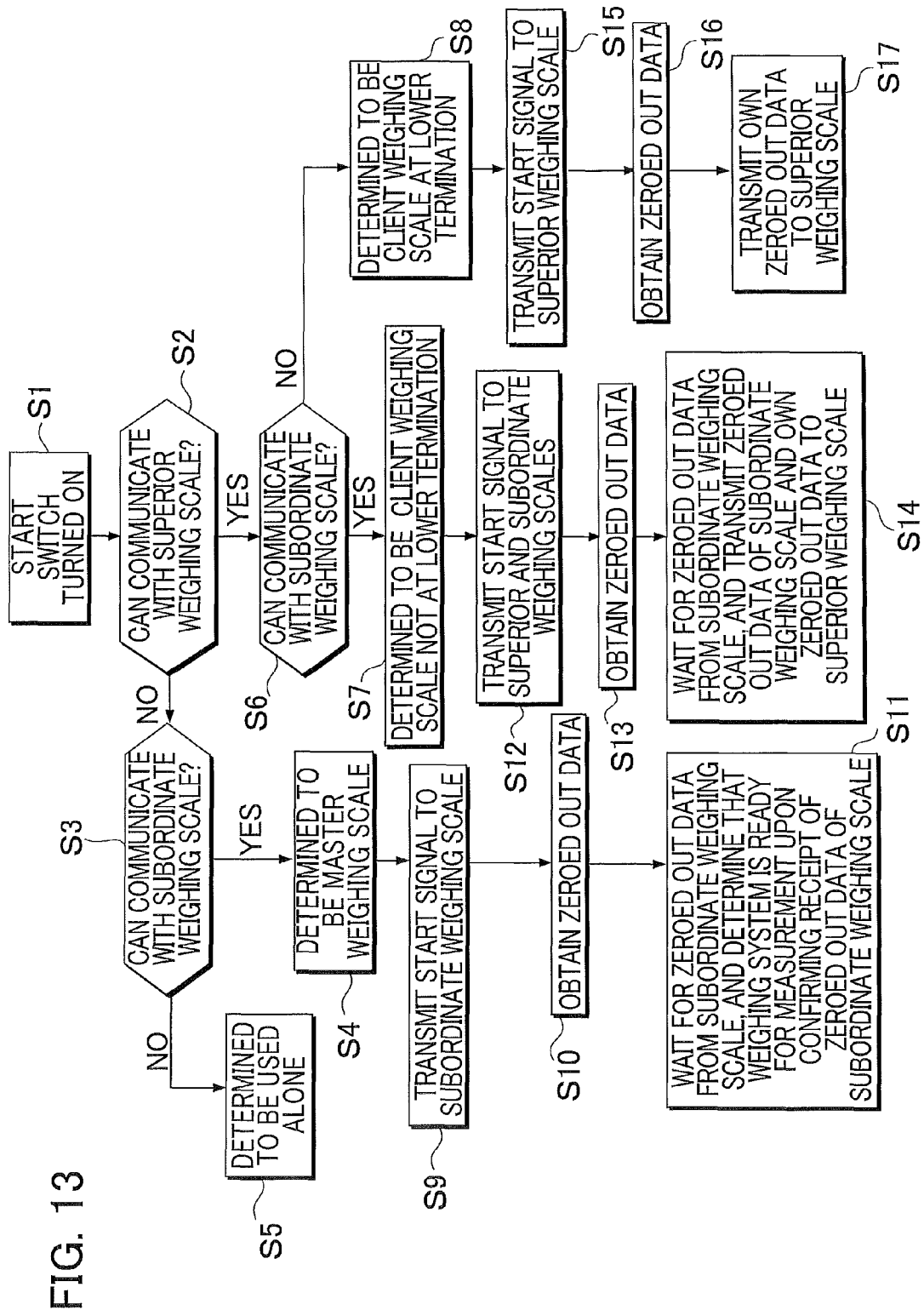

Description will be given of, when start switch 16 of one of the connected weighing scales is operated to be turned on, an operation of the weighing scale. FIG. 13 is a flowchart showing a detailed operation of the weighing scale when start switch 16 thereof is turned on. When start switch 16 of one of weighing scales is first operated to be turned on by a user (Step S1), electricity is supplied from the power source to each unit of the electric system of this weighing scale. Determiner 71 of microcomputer 70 of this weighing scale, upon detecting that start switch 16 thereof was operated to be turned on, determines whether this weighing scale is a master weighing scale, a client weighing scale not at the lower termination, or a client weighing scale at the lower termination, or is used alone. Start signal transmitter 73 of microcomputer 70 of this weighing scale, in a case in which it is determined by determiner 71 that this weighing scale is a master weighing scale, transmits a start signal to a subordinate weighing scale. Start signal transmitter 73, in a case in which it is determined that this weighing scale is a client weighing scale not at the lower termination, transmits a start signal to each of a superior weighing scale and a subordinate weighing scale, and, in a case in which it is determined that this weighing scale is a client weighing scale at the lower termination, transmits a start signal to a superior weighing scale. Start signal transmitter 73, in a case in which it is determined that this weighing scale is used alone, does not transmit a start signal. Detailed description will follow.

In Steps S2 to S8 in FIG. 13, a determination process is performed for determining whether the weighing scale is a master weighing scale, a client weighing scale, or is used alone. Description on the processes in Steps S2 to S8 in FIG. 13 will be omitted because they are the same as those of Steps S2 to S8 in FIG. 4. Furthermore, description on the processes of Steps S9 to S11 will also be omitted because they are the same as those of Steps S10 to S12 in FIG. 5.

In the following, description will be given of the processes of Steps S12 to S17 that are different from the first embodiment.

After Step S7, microcomputer 70 of a weighing scale which is determined as a client weighing scale located at the position other than the lower termination (i.e., intermediate position) outputs a start signal via first port 42 of this weighing scale to a superior weighing scale, and additionally outputs a start signal from second port 44 to a subordinate weighing scale (Step S12).

Microcomputer 70 of this weighing scale obtains zeroed out data output from weight measurer 30 of this weighing scale (Step S13).

Microcomputer 70 of this weighing scale waits for the receipt of zeroed out data of a subordinate weighing scale via second port 44 of this weighing scale, and, upon receiving the zeroed out data of the subordinate weighing scale, transmits the received zeroed out data and the zeroed out data of this weighing scale to a superior weighing scale (Step S14).

After Step S8, microcomputer 70 of a weighing scale which is determined as a client weighing scale located at the lower termination transmits a start signal via first port 42 of this weighing scale to a superior weighing scale (Step S15).

The microcomputer of this weighing scale obtains zeroed out data output from weight measurer 30 thereof (Step S16).

The microcomputer transmits the zeroed out data of this weighing scale to a superior weighing scale (Step S17).

Figure 14:
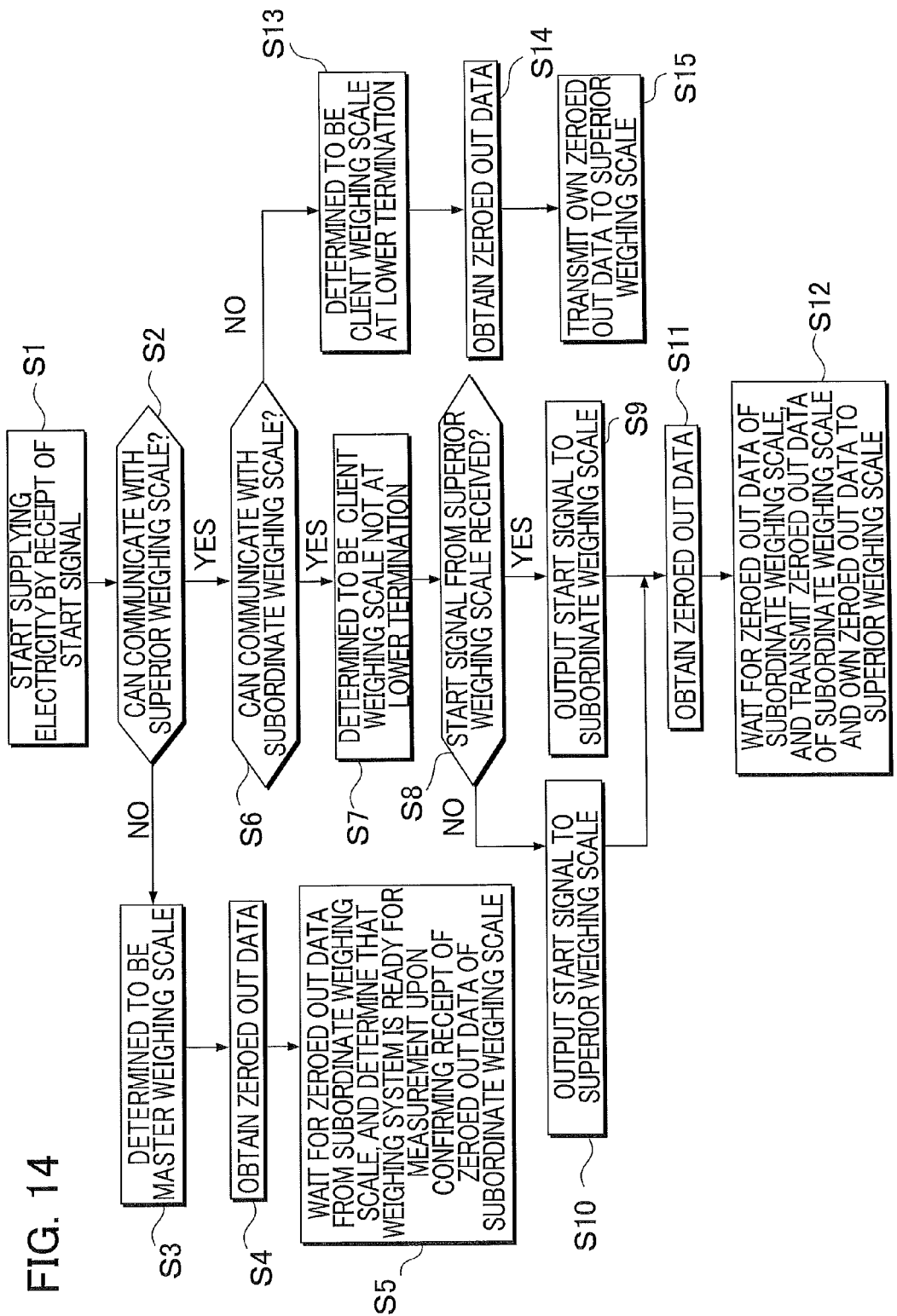
FIG. 14 is a flowchart showing an operation of the weighing scale according to the embodiment upon receiving a start signal.

B-3: Operation of Weighing Scale Upon Receiving Start Signal from Superior Weighing Scale or Subordinate Weighing Scale Description will next be given of an operation of a weighing scale upon receiving a start signal either from a superior weighing scale or a subordinate weighing scale. FIG. 14 is a flowchart showing a detailed operation of a weighing scale upon receiving a start signal. In a case in which a start signal is received either from a superior weighing scale or a subordinate weighing scale, electricity is supplied from power source 60 of this weighing scale to each unit of the electric system thereof (Step S1). Determiner 71 of microcomputer 70 of this weighing scale, upon detecting the receipt of a start signal, determines whether this weighing scale is a master weighing scale, a client weighing scale not at the lower termination, or a client weighing scale at the lower termination. Start signal transmitter 73 of microcomputer 70 of this weighing scale, in a case in which it is determined by determiner 71 that this weighing scale is a master weighing scale or a client weighing scale at the lower termination, does not transmit the received start signal to another weighing scale. In a case in which it is determined by determiner 71 that this weighing scale is a client weighing scale not at the lower termination, start signal transmitter 73 transmits the received start signal to either a superior weighing scale or a subordinate weighing scale that has not transmitted the start signal to this weighing scale. Detailed description thereof will follow.

When the receipt of a start signal causes the electricity to be supplied from power source 60 to each unit of the electric system of the weighing scale, microcomputer 70 of this weighing scale first determines whether this weighing scale is capable of communicating with a superior weighing scale (Step S2). In the present embodiment, microcomputer 70 detects whether communication cable 20 is connected to first port 42, thereby to determine whether this weighing scale is capable of communicating with a superior weighing scale. More specifically, microcomputer 70 transmits a transmission signal for connection confirmation via first port 42 of this weighing scale, and determines that this weighing scale is capable of communicating with a superior weighing scale in a case of detecting a reply signal for connection confirmation. On the other hand, in a case in which a reply signal for connection confirmation is not detected within a certain time period, microcomputer 70 determines that this weighing scale is not capable of communicating with a superior weighing scale.

In a case in which a result of the determination in Step S2 is negative, microcomputer 70 of this weighing scale determines that this weighing scale is a master weighing scale (Step S3), then obtains zeroed out data output from weight measurer 30 of this weighing scale (Step S4). Microcomputer 70 of this weighing scale then waits for receipt of zeroed out data of a subordinate weighing scale to be transmitted via second port 44, and, in a case in which the receipt is confirmed of the zeroed out data of the subordinate weighing scale, determines that the line of connected weighing scales is ready for weight measurement as a system (Step S5).

On the other hand, in a case in which a result of the determination in Step S2 is affirmative, microcomputer 70 of this weighing scale determines whether this weighing scale is capable of communicating with a subordinate weighing scale (Step S6). In the present embodiment, microcomputer 70 detects whether communication cable 20 is connected to second port 44, thereby to determine whether this weighing scale is capable of communicating with a subordinate weighing scale. More specifically, for example, microcomputer 70 transmits a transmission signal for connection confirmation via second port 44 of this weighing scale, and in a case of detecting a reply signal for connection confirmation, determines that this weighing scale is capable of communicating with a subordinate weighing scale. On the other hand, in a case in which a reply signal for connection confirmation is not received within a certain time period, microcomputer 70 determines that this weighing scale is not capable of communicating with a subordinate weighing scale.

In a case in which a result of the determination in Step S6 is affirmative, microcomputer 70 of this weighing scale determines that this weighing scale is a client weighing scale that is located at a position other than the lower termination (i.e., the intermediate position) (Step S7).

Microcomputer 70 of a weighing scale that was determined in Step S7 as being a client weighing scale not at the lower termination outputs the received start signal received via communication unit 40 to either a superior weighing scale or a subordinate weighing scale that did not transmit the start signal to this weighing scale. More specific description follows.

Microcomputer 70 of this weighing scale determines whether it has received the start signal from a superior weighing scale (i.e., via first port 42 of this weighing scale) (Step S8).

In a case in which a result of the determination in Step S8 is affirmative, microcomputer 70 of this weighing scale outputs the received start signal to a subordinate weighing scale (Step S9). On the other hand, in a case in which a result of the determination in Step S8 is negative, microcomputer 70 of this weighing scale outputs the received start signal to a superior weighing scale (Step S10).

After Step S9 or Step S10, microcomputer 70 of this weighing scale obtains zeroed out data output from weight measurer 30 (Step S11), waits for receipt of zeroed out data of a subordinate weighing scale, to be transmitted via second port 44 of this weighing scale, and, upon receiving the zeroed out data of a subordinate weighing scale, transmits the received zeroed out data and the zeroed out data of this weighing scale to a superior weighing scale (Step S12).

Furthermore, in a case in which a result of the determination in Step S6 is negative, microcomputer 70 of this weighing scale determines that this weighing scale is a client weighing scale located at the lower termination (Step S13), and obtains zeroed out data output from weight measurer 30 of this weighing scale (Step S14), then to transmit the zeroed out data of this weighing scale to a superior weighing scale (Step S15).

B-4: Detailed Operation of the Present Embodiment

Figure 15:
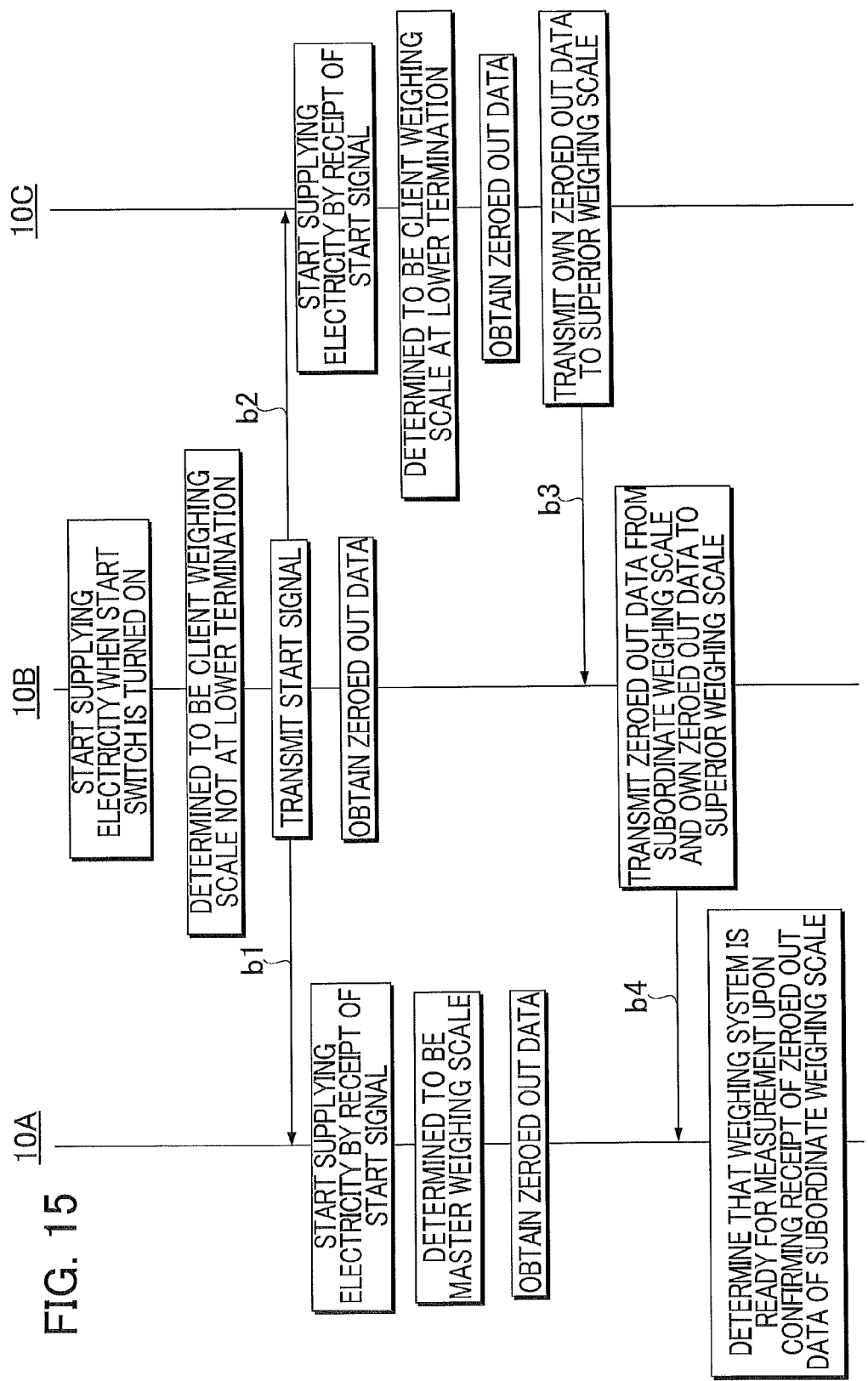
FIG. 15 is a sequence chart showing a detailed operation of each weighing scale.

Description will next be given of a detailed operation of each weighing scale when start switch 16 of one of the weighing scales (10A, 10B, and 10C) according to the present embodiment is operated to be turned on. Here, a case in assumed in which start switch 16 of weighing scale 10B is turned on. FIG. 15 is a sequence chart showing a detailed operation of each weighing scale (10A, 10B, and 10C) when start switch 16 of weighing scale 10B is operated so as to be turned on.

When start switch 16 of weighing scale 10B is first turned on, this weighing scale 10B performs the processes of Steps S1→S2→S6→S7 in FIG. 13, thereby to determine that this weighing scale 10B is a client weighing scale not at the lower termination (intermediate).

Weighing scale 10B then performs the process of Step S12 in FIG. 13, thereby to output a start signal to superior weighing scale 10A (b1 shown in FIG. 15), and additionally to output a start signal to subordinate weighing scale 10C (b2 shown in FIG. 15). Weighing scale 10B then obtains zeroed out data output from weight measurer 30 of this weighing scale 10B, to enter a standby state.

Weighing scale 10A, upon receiving a start signal from weighing scale 10B, performs the processes of Steps S1→S2→S3 in FIG. 14, thereby to determine that this weighing scale is a master weighing scale.

Weighing scale 10A then performs the process of Step S4 in FIG. 14, to obtain zeroed out data output from weight measurer 30 of weighing scale 10A, to enter a standby state.

Weighing scale 10C, upon receiving a start signal from weighing scale 10B, performs the processes of Steps S1→S2→S6→S13 in FIG. 14, to determine that this weighing scale 10C is a client weighing scale located at the lower termination.

Weighing scale 10C then performs the processes of Step S14→S15 in FIG. 14, thereby to obtain zeroed out data output from weight measurer 30 of this weighing scale 10C, to transmit the zeroed out data of this weighing scale to superior weighing scale 10B (b3 shown in FIG. 15).

Weighing scale 10B then performs the process of Step S12 in FIG. 14, to transmit the zeroed out data of weighing scale 10C and the zeroed out data of weighing scale 10B to weighing scale 10A (b4 shown in FIG. 15).

Weighing scale 10A, by performing the process of Step S5 in FIG. 14, determines that the line of the connected weighing scales as a system is ready for weight measurement.

The process performed at weighing scale 10A, weighing scale 10B, and weighing scale 10C each advances to the section A-5, "weight measurement process", which was described with respect to the above-described first embodiment. The weight measurement process performed by weighing scale 10C after the transmission of zeroed out data to superior weighing scale 10B is the same as that of the first embodiment, and therefore, the description thereof will be omitted.

As described in the foregoing, according to this second embodiment, the weight of an object to be weighed can be easily measured, and a user can easily know a measurement result as in the first embodiment.

Furthermore, because the line of connected weighing scales operates as a system when the start switch of any of master weighing scale 10A, and client weighing scales 10B and 10C, is turned on, unlike in the first embodiment, the weighing scale of the present embodiment can be effectively used when the flexibility in activation is given priority over the prevention of the erroneous activation.

C: Third Embodiment

Description will next be given of a weighing scale (10A, 10B, and 10C) according to a third embodiment of the present invention. In each of the above embodiments, a weighing scale that is not capable of communicating with a superior weighing scale and that is capable of communicating with a subordinate weighing scale (i.e., a weighing scale at the upper termination) serves as a master weighing scale. However, in the third embodiment, a weighing scale for which the start switch is operated so as to be turned on serves as a master weighing scale. Detailed description thereof will follow.

C-1: Configuration

In the present embodiment, the external view of weighing scales (10A, 10B, and 10C) and how they are connected are the same as those of each of the above embodiments, and are such as shown in FIGS. 1 and 3. The weighing scale of the present embodiment differs from that of each of the above embodiments in that determiner 71 of microcomputer 70 of each weighing scale according to the present embodiment has a function of, upon detecting that start switch 16 has been operated to be turned on, determining that this weighing scale is a master weighing scale, whereas, upon detecting the receipt of a start signal, determining that this weighing scale is a client weighing scale.

Figure 16:
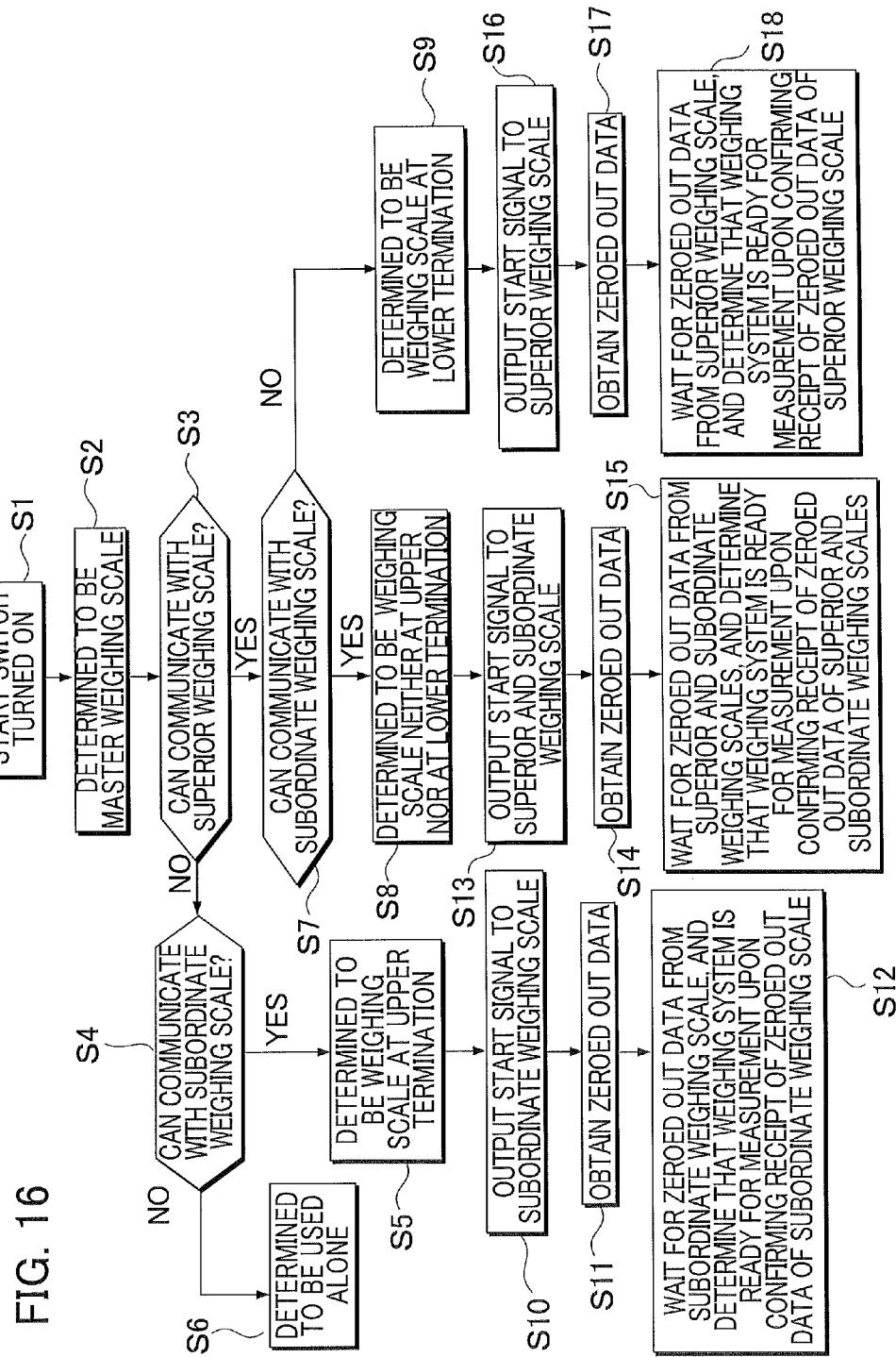

C-2: Operation of Weighing Scale when Start Switch is Operated to be in an on State Description will next be given of an operation of a weighing scale when start switch 16 is operated to be in an on state. FIG. 16 is a flowchart showing a detailed operation of a weighing scale when start switch 16 is operated to be in an on state. In a case in which start switch 16 of one of weighing scales is first operated to be in an on state by a user (Step S1), electricity is supplied from power source 60 of this weighing scale to each unit of the electric system of this weighing scale. Microcomputer 70 of this weighing scale, upon detecting that start switch 16 has been operated to be in an on state, determines whether this weighing scale is a master weighing scale (Step S2). Microcomputer 70 then determines whether this weighing scale is a weighing scale that is at the upper termination, a weighing scale that is neither at the upper termination nor at the lower termination, a weighing scale at the lower termination, or is used alone. A weighing scale that is at the upper termination is one that is not capable of communicating with a superior weighing scale and is capable of communicating with a subordinate weighing scale. Furthermore, a weighing scale that is neither at the upper termination nor at the lower termination is one that is capable of communicating with a superior weighing scale and a subordinate weighing scale. Furthermore, a weighing scale at the lower termination is one that is capable of communicating with a superior weighing scale and is not capable of communicating with a subordinate weighing scale. Detailed description of the processes of Steps S3 to S9 in FIG. 16 will be omitted because they are the same as the processes of Steps S2 to S8 in FIG. 13.

Description will next be given of the processes of Steps S10 to S18 in FIG. 16. In Step S5, microcomputer 70 of a weighing scale that is determined as being at the upper termination transmits a start signal to a subordinate weighing scale (Step S10). Microcomputer 70 of this weighing scale then obtains zeroed out data output from weight measurer 30 of this weighing scale (Step S11) and waits for zeroed out data of a subordinate weighing scale to be received. Microcomputer 70, upon confirming the receipt of the zeroed out data of a subordinate weighing scale, determines that the line of connected weighing scales is ready as a system for weight measurement (Step S12).

Microcomputer 70 of a weighing scale that was determined in Step S8 that the weighing scale is neither at the upper termination nor at the lower termination transmits a start signal to each of a superior weighing scale and a subordinate weighing scale (Step S13). Microcomputer 70 of this weighing scale obtains zeroed out data output from weight measurer 30 thereof (Step S14) and waits for zeroed out data of a superior weighing scale and that of a subordinate weighing scale to be received. Microcomputer 70, upon confirming the receipt of the zeroed out data of a superior weighing scale and that of a subordinate weighing scale, determines that the line of connected weighing scales as a system is ready for weight measurement (Step S15).

Microcomputer 70 of a weighing scale that was determined in Step S9 to be a weighing scale at the lower termination transmits a start signal to a superior weighing scale (Step S16). Microcomputer 70 of this weighing scale obtains zeroed out data output from weight measurer 30 thereof (Step S17), and waits for zeroed out data of a superior weighing scale to be received. Microcomputer 70, upon confirming the receipt of the zeroed out data of a superior weighing scale, determines that the line of connected weighing scales as a system is ready for weight measurement (Step S18).

C-3: Operation of Weighing Scale Upon Receiving Start Signal

Figure 17:
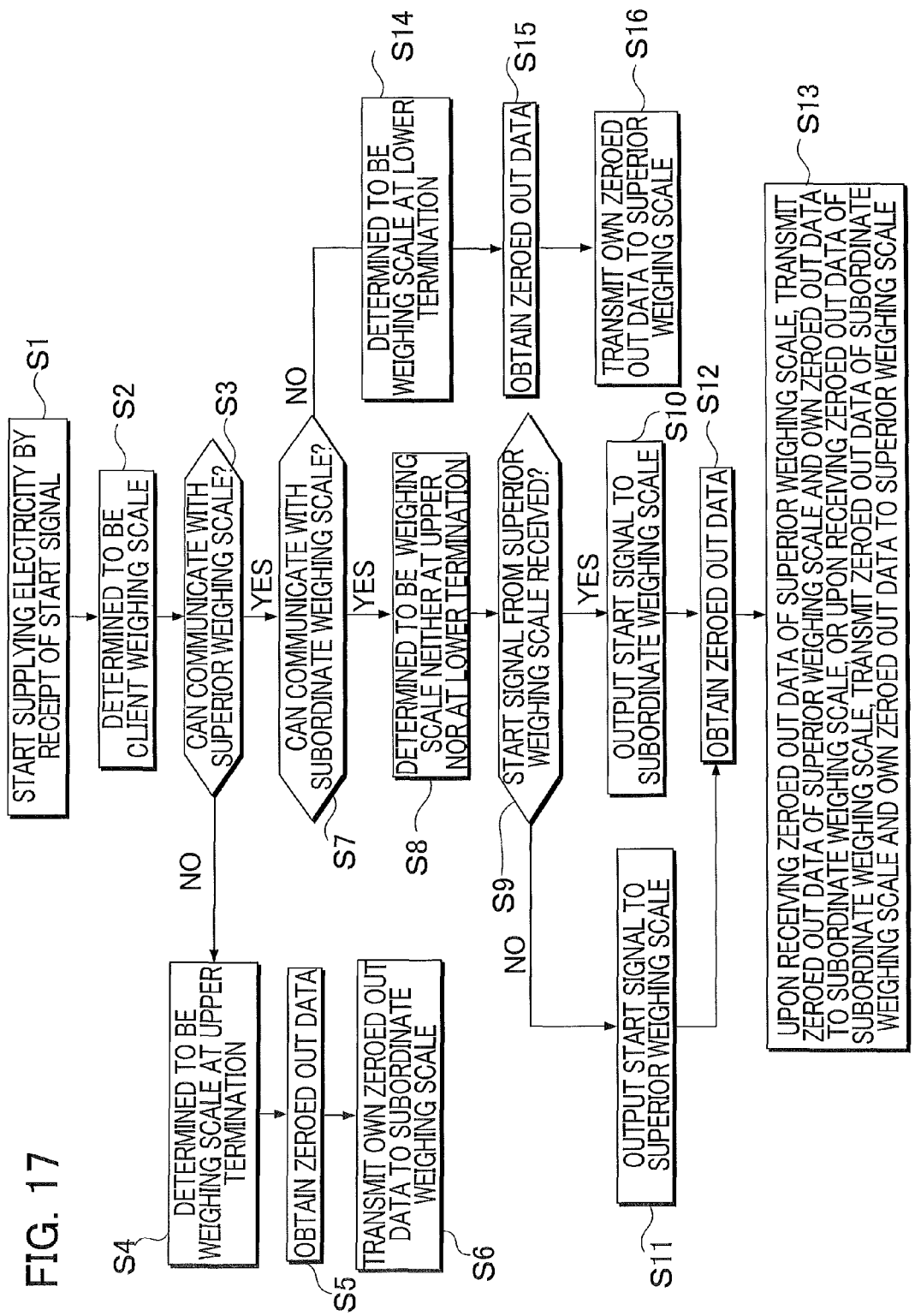
FIG. 17 is a flowchart showing an operation of the weighing scale according to the embodiment upon receiving a start signal.

Description will next be given of an operation of a weighing scale when it receives a start signal. FIG. 17 is a flowchart showing a detailed operation of a weighing scale when it receives a start signal. Upon receiving a start signal either from a superior weighing scale or from a subordinate weighing scale, electricity is supplied from power source 60 of this weighing scale to each unit of the electric system of this weighing scale (Step S1). Microcomputer 70, upon detecting the receipt of the start signal, determines that this weighing scale is a client weighing scale (Step S2).

Description of Steps S3 to S5 in FIG. 17 will be omitted because they are the same as Steps S2 to Step S4 in FIG. 14. Controller 72 of microcomputer 70A of a weighing scale that is determined in Step S4 in FIG. 17 that the weighing scale is at the upper termination transmits zeroed out data of this weighing scale to a subordinate weighing scale (Step S6 in FIG. 17).

Description of Steps S7 to S12 in FIG. 17 will be omitted because they are the same as Steps S6 to S11 in FIG. 14. Microcomputer 70 of a weighing scale that is determined in Step S8 in FIG. 17 to be a weighing scale that is neither at the upper termination nor at the lower termination, upon receiving zeroed out data of a superior weighing scale, transmits the received zeroed out data and the zeroed out data of this weighing scale to a subordinate weighing scale. Furthermore, microcomputer 70, upon receiving zeroed out data of a subordinate weighing scale, transmits the received zeroed out data and the zeroed out data of its weighing scale to a superior weighing scale (Step S13 in FIG. 17).

Description of Steps S14 to S16 in FIG. 17 will be omitted because they are the same as Steps S13 to S15 in FIG. 14.

C-4: Detailed Operation of the Present Embodiment

Figure 18:
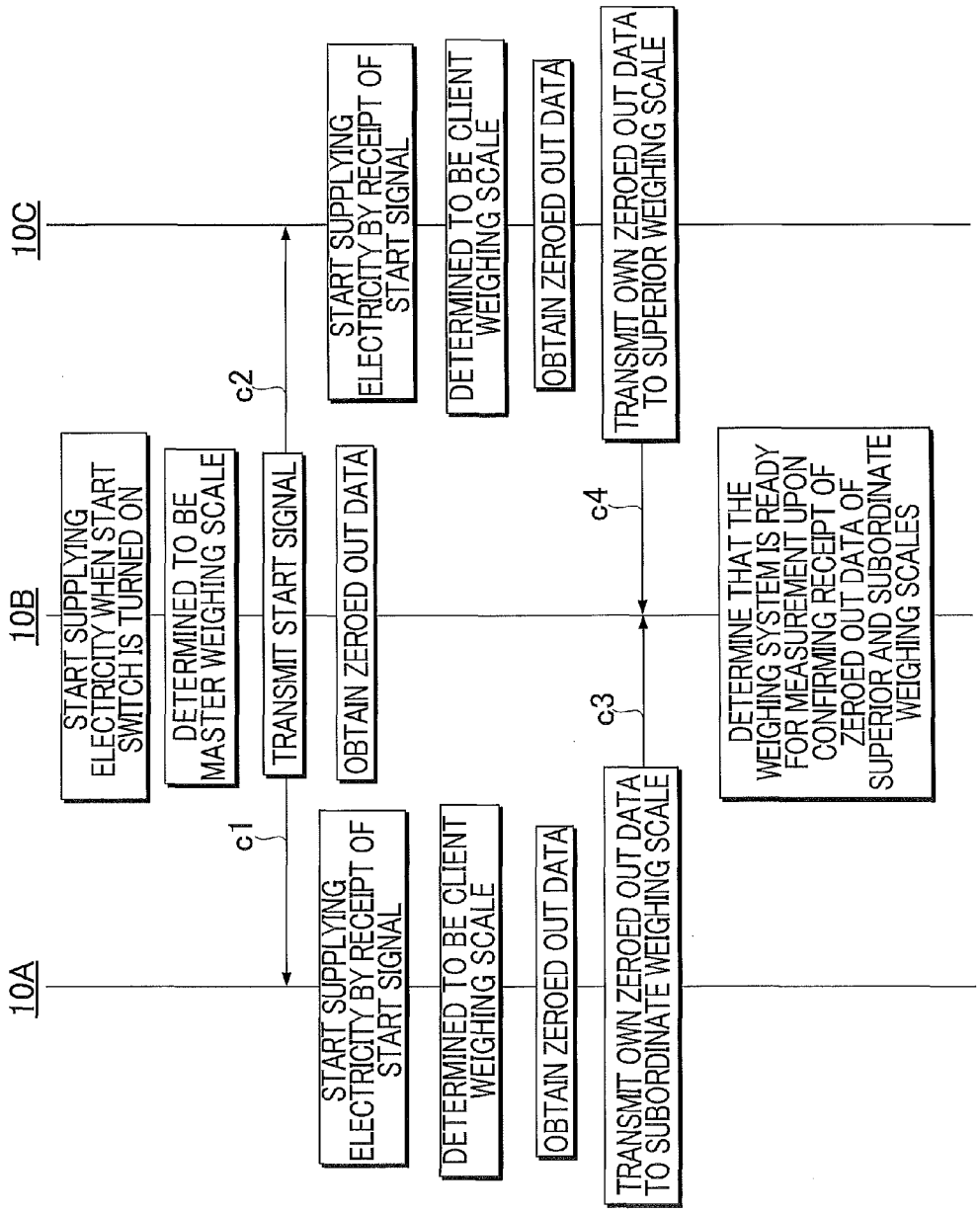
FIG. 18 is a sequence chart showing a detailed operation of each weighing scale.

Description will next be given of a detailed operation of each weighing scale when start switch 16 of one of weighing scales (10A, 10B, and 10C) according to the present embodiment is operated to be in an on state. A case is assumed here in which start switch 16 of weighing scale 10B is operated to be in an on state. FIG. 18 is a sequence chart showing a detailed operation of weighing scales (10A, 10B, and 10C) when start switch 16 of weighing scale 10B is operated to be in an on state.

When start switch 16 of weighing scale 10B is operated to be in an on state, it is determined in the process of Step S2 in FIG. 16 that this weighing scale 10B is a master weighing scale. Weighing scale 10B is then determined to be a weighing scale that is neither at the upper termination nor at the lower termination (i.e., intermediate) by going through the processes of Steps S3→S7→S8 in FIG. 16. Weighing scale 10B then, in the process of Step S13 in FIG. 16, transmits a start signal to superior weighing scale 10A and subordinate weighing scale 10C (c1 and c2 shown in FIG. 18). Weighing scale 10B, in the process of Step S14 in FIG. 16, obtains zeroed out data.

Weighing scale 10A, upon receiving a start signal from weighing scale 10B, is determined to be a client weighing scale in the process of Step S2 in FIG. 17. Weighing scale 10A is then determined to be a weighing scale that is the upper termination by performing the processes of Steps S3→S4 in FIG. 17. Weighing scale 10A obtains zeroed out data by the process of Step S5 in FIG. 17. Weighing scale 10A transmits the zeroed out data of this weighing scale to a subordinate weighing scale by the process of Step S6 in FIG. 17 (c3 shown in FIG. 18).

Weighing scale 10C, upon receiving a start signal from weighing scale 10B, is determined to be a client weighing scale by performing the process of Step S2 in FIG. 17. Weighing scale 10C then, by performing the processes of Steps S3→S7→S14 in FIG. 17, is determined to be a weighing scale at the lower termination. Weighing scale 10C, by performing the process of Step S15 in FIG. 17, obtains zeroed out data. Weighing scale 10C then, by performing the process of Step S16 in FIG. 17, transmits the zeroed out data of this weighing scale to a superior weighing scale (c4 as shown in FIG. 18).

Weighing scale 10B that is a master weighing scale, upon confirming the receipt of the zeroed out data of superior weighing scale 10A and the zeroed out data of subordinate weighing scale 10C, determines that the line of connected weighing scales as a system is ready for weight measurement (refer to Step S13 in FIG. 17).

C-5: Weight Measurement Process

Figure 19:
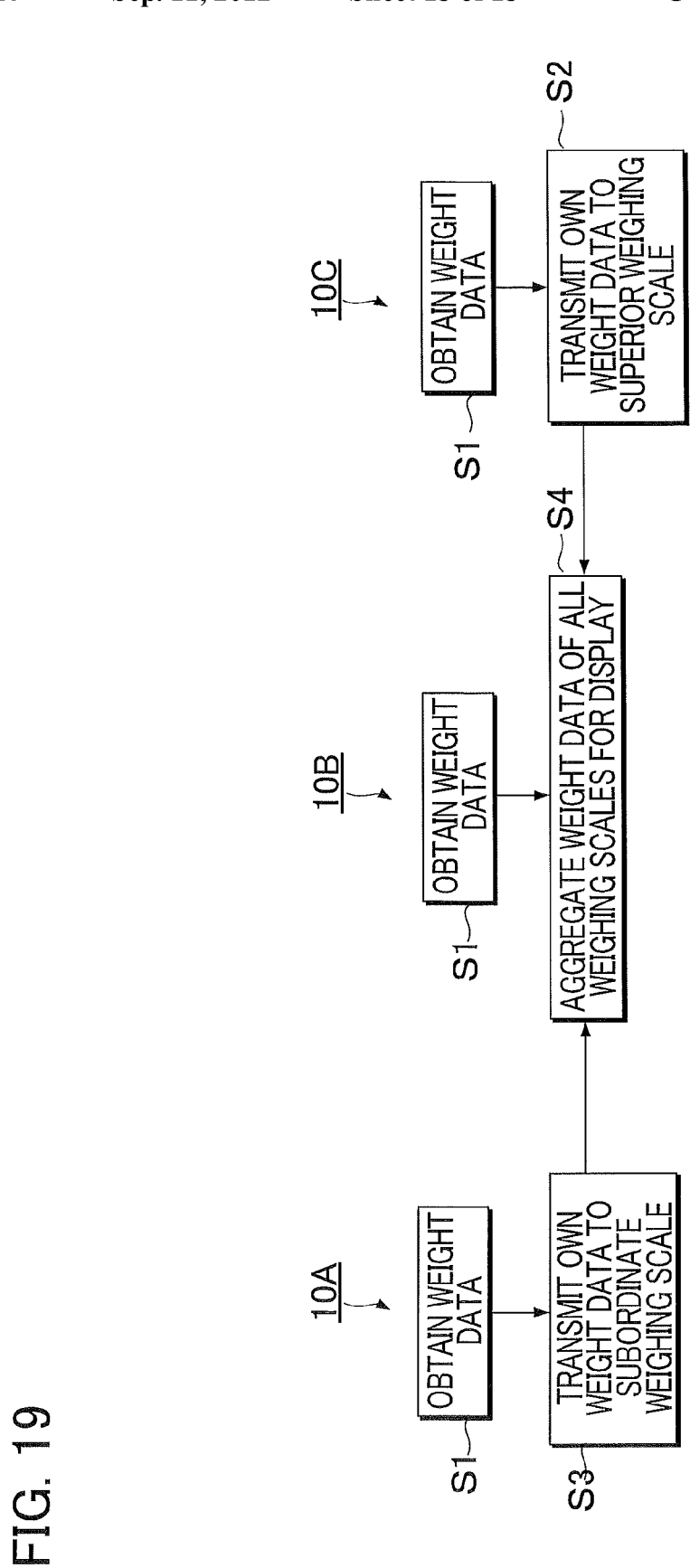
FIG. 19 is a diagram showing a weight measurement process.

Description will next be given of a weight measurement process performed when an object to be weighed is loaded on all the platforms 12 of weighing scales (10A, 10B, and 10C) of the present embodiment after the line of connected weighing scales (10A, 10B, and 10C) as a system becomes ready for weight measurement by performing the processes in FIG. 18. FIG. 19 is a diagram showing the details of this weight measurement process. Microcomputer 70 of each weighing scale (10A, 10B, and 10C) controls weight measurer 30 to execute measurement of the object to be weighed on platform 12 of this weighing scale (Step S1).

Controller 72 of microcomputer 70 of weighing scale 10C that is at the lower termination transmits weight data output by weight measurer 30 of this weighing scale 10C to superior weighing scale 10B (Step S2). Furthermore, controller 72 of microcomputer 70 of weighing scale 10A that is at the upper termination transmits weight data output by weight measurer 30 of this weighing scale 10A to subordinate weighing scale 10B (Step S3).

Controller 72 of microcomputer 70 of weighing scale 10B, upon receiving the weight data of superior weighing scale 10A and weight data of subordinate weighing scale 10C, aggregates the received weight data and the weight data of this weighing scale 10B, for display on display unit 14 of weighing scale 10B (Step S4). Thus, as in each of the above embodiments, controller 72 of microcomputer 70 according to the present embodiment, in a case in which it is determined by determiner 71 that the weighing scale therefor is a master weighing scale, aggregates weight data output by weight measurer 30 of this weighing scale and the pieces of weight data of other weighing scales, to display them on display unit 14 of this weighing scale, whereas in a case in which it is determined by determiner 71 that this weighing scale is a client weighing scale, transmits the weight data output by weight measurer 30 of this weighing scale to the master weighing scale.

As described in the foregoing, according to this third embodiment, as in the first embodiment, the weight of an object to be weighed can be easily measured, and a user can easily know a measurement result.

Furthermore, from among weighing scales (10A, 10B, and 10C), because only the weighing scale for which the start switch is operated to be in an on state becomes the master weighing scale, there is an advantage in that a user can easily select which weighing scale is used to aggregate pieces of weight data of weighing scales (10A, 10B, and 10C).

D: Modification

The present invention is not limited to the above-described embodiments, and the following modifications are possible. Furthermore, from among the modifications shown below, two or more modifications can be combined.

(1) Modification 1

In each of the above embodiments, three weighing scales (10A, 10B, and 10C) are connected via communication unit 40 in a state in which they can communicate with each other; however, the number of weighing scales can be freely selected. For example, four or more weighing scales can be connected via communication unit 40 so that they can communicate with each other, or two weighing scales can be connected via communication unit 40 so that they can communicate with each other.

In a mode in which two weighing scales are connected via communication unit 40 so that they can communicate with each other, there is no client weighing scale that is not at the lower termination.

Therefore, in a case in which this modification is applied to the above first embodiment and the second embodiment, microcomputer 72 of each weighing scale does not have to have a function of transmitting weight data (including zeroed out data) received from a subordinate weighing scale via communication unit 40 and weight data (including zeroed out data) output from weight measurer 30 of this weighing scale to a superior weighing scale. Therefore, microcomputer 72 of each weighing scale only has to have a function of, in a case in which it is determined that this weighing scale is a master weighing scale, aggregating weight data received from a subordinate weighing scale via communication unit 40 and weight data output from weight measurer 30, to display them on display unit 14, whereas in a case in which this weighing scale is a client weighing scale at the lower termination, of transmitting weight data output by weight measurer 30 of this weighing scale via communication unit 40 to a superior weighing scale.

Furthermore, in a case in which this modification is applied to the third embodiment, microcomputer 72 of each weighing scale does not have to have a function of transmitting, to a superior weighing scale, each piece of weight data (also for each zeroed out data) received from a superior or subordinate weighing scale via communication unit 40 and each piece of weight data (also for each zeroed out data) output by weight measurer 30 of this weighing scale. Thus, microcomputer 72 of each weighing scale only has to have a function of, in a case in which this weighing scale is a master weighing scale, aggregating weight data received from a superior or a subordinate weighing scale via communication unit 40 and weight data output by weight measurer 30, to display them on display unit 14, whereas, in a case in which it is determined that this weighing scale is a client weighing scale at the lower termination, of transmitting weight data output by weight measurer 30 of this weighing scale to a superior weighing scale via communication unit 40.

(2) Modification 2

In each of the above embodiments, weighing scales are capable of communicating with each other by a wired connection via communication cable 20; however, the present invention is not limited thereto. For example, communication unit 40 of each weighing scale may be made of an antenna for wireless communication, so that weighing scales can communicate with each other wirelessly. Thus, communication unit 40 of each weighing scale at least has to be a means for communicating with at least one of a superior weighing scale and a subordinate weighing scale.

(3) Modification 3

In each of the above embodiments, an example was given in which a master weighing scale aggregates weight data of each weighing scale for display; however, the present invention is not limited thereto. For example, a client weighing scale may receive weight data of each weighing scale from a master weighing scale, so that the client weighing scale can aggregate the received weight data of each weighing scale for display.

(4) Modification 4

In the above first embodiment and the second embodiment, microcomputer 70 of client weighing scale 10B that is not at the lower termination appends weight data received from subordinate weighing scale 10C via second port 44 to the tail end of the weight data of this weighing scale 10B, to make serial data; however, the present invention is not limited thereto. For example, microcomputer 70 of weighing scale 10B may append weight data received from subordinate weighing scale 10C via second port 44 to the head end of the weight data of this weighing scale 10B, to make serial data.

(5) Modification 5

In each of the above embodiments, an example was given in which weight data of weighing scales are aggregated by and displayed at a master weighing scale; however, the present invention is not limited thereto. For example, a processing apparatus such as a PC (Personal Computer) may be connected to a master weighing scale, so that pieces of weight data of weighing scales are aggregated by and information based on the aggregated pieces of weight data is displayed at this processing apparatus.

(6) Modification 6

In the above first embodiment, in a case in which a result of the determination of Step S2 in FIG. 4 is affirmative, microcomputer 70 additionally determines whether this weighing scale is capable of communicating with a subordinate weighing scale; however, the present invention is not limited thereto. In a case in which a result of the determination of Step S2 in FIG. 4 is affirmative, microcomputer 70 may turn off the operation of this weighing scale immediately. This is because, in a case in which this weighing scale is determined to be capable of communicating with a superior weighing scale, it is immediately apparent that this weighing scale is a client weighing scale. According to this modification, because there is no need to perform additional determination as to whether this weighing scale is capable communicating with a subordinate weighing scale, there is an advantage in that the control process of microcomputer 70 can be reduced (control processing load can be reduced).

What is claimed is:
1. A weighing scale comprising:
a platform for loading an object to be weighed;

a weight measurer for measuring a weight of the object to be weighed when the object is loaded on the platform, to output weight data representing the measured weight;

a display unit for displaying, as a measurement result, the weight represented by the weight data output by the weight measurer;

a communication unit for transmitting the weight data to another weighing scale and for receiving weight data from the another weighing scale;

a determiner that determines whether the weighing scale is capable of communicating with the another weighing scale via the communication unit; and a controller that controls the display unit to display the weight represented by the weight data output by the weight measurer in a case in which a result of the determination by the determiner indicates that the weighing scale is not capable of communicating with the another weighing scale, and that transmits the weight data to, or receives from, the another weighing scale in a case in which a result of the determination by the determiner indicates that the weighing scale is capable of communicating with the another weighing scale.

2. A weighing scale according to claim 1, wherein the weighing scale is one of serially connectable weighing scales, one of the plural weighing scales serving as a master weighing scale and the other serving a client weighing scale, the determiner, in a case of determining that the weighing scale is capable of communicating with the another weighing scale, additionally determines whether the weighing scale is the master weighing scale or the client weighing scale, the controller, in a case in which it is determined by the determiner that the weighing scale is the master weighing scale, aggregates the weight data output by the weighing scale and the weight data of the another weighing scale received via the communication unit, to cause information based on the aggregated weight data to be displayed on the display unit of the weighing scale, and the controller, in a case in which it is determined by the determiner that the weighing scale is the client weighing scale, transmits the weight data output by the weight measurer of the weighing scale to the master weighing scale via the communication unit.

3. A weighing scale according to claim 2, wherein the another weighing scale is, from among the serially connectable weighing scales, either superior or subordinate in relation to the weighing scale, the determiner determines that the weighing scale is the master weighing scale when the weighing scale is not capable of communicating with a superior weighing scale and when the weighing scale is capable of communicating with a subordinate weighing scale, the determiner determines that the weighing scale is the client weighing scale when the weighing scale is capable of communicating with a superior weighing scale and when the weighing scale is not capable of communicating with a subordinate weighing scale.

4. A weighing scale according to claim 3, further comprising a start signal transmitter for transmitting a start signal to the another weighing scale, wherein the determiner determines that the weighing scale is the master weighing scale in a case in which it is detected that a start switch for starting the operation of the weighing scale has been switched to be in an on state, and the start signal transmitter transmits the start signal to the another weighing scale in a case in which it is determined by the determiner that the weighing scale is the master weighing scale.

5. A weighing scale according to claim 3, further comprising a start signal transmitter for transmitting a start signal to the another weighing scale, wherein the determiner determines whether the weighing scale is the master weighing scale or the client weighing scale in a case in which it is detected that a start switch for starting the operation of the weighing scale has been switched to be in an on state, the start signal transmitter transmits the start signal to the another weighing scale in a case in which it is determined by the determiner that the weighing scale is the master weighing scale, the start signal transmitter, when it is determined by the determiner that the weighing scale is the client weighing scale and when it is determined that the weighing scale is capable of communicating with a subordinate weighing scale, transmits the start signal to each of the superior weighing scale and the subordinate weighing scale, and the start signal transmitter, when it is determined by the determiner that the weighing scale is the client weighing scale and when it is determined that the weighing scale is not capable of communicating with a subordinate weighing scale, transmits the start signal to the superior weighing scale.

6. A weighing scale according to claim 2, wherein the determiner determines that the weighing scale is the master weighing scale in a case in which it is detected that a start switch for starting the operation of the weighing scale has been switched to be in an on state, the determiner determines that the weighing scale is the client weighing scale in a case in which the receipt of a start signal is detected.

7. A weighing scale according to claim 6, further comprising a start signal transmitter for, in a case in which it is determined by the determiner that the weighing scale is the master weighing scale, transmitting a start signal to the another weighing scale.

* * * * *